(12) United States Patent
Baba et al.

(10) Patent No.: US 7,123,804 B2
(45) Date of Patent: Oct. 17, 2006

(54) OPTICAL CONTROL ELEMENT

(75) Inventors: Toshihiko Baba, Tokyo (JP); Daisuke Mori, Kanagawa (JP)

(73) Assignees: Ricoh Company, LTD, Tokyo (JP); Toshihiko Baba, Tokyo (JP)

( * ) Notice: Subject to any disclaimer, the term of this patent is extended or adjusted under 35 U.S.C. 154(b) by 0 days.

(21) Appl. No.: 10/994,369

(22) Filed: Nov. 23, 2004

(65) Prior Publication Data
US 2005/0152659 A1 Jul. 14, 2005

(30) Foreign Application Priority Data

Nov. 25, 2003 (JP) ............... 2003-394536
Feb. 17, 2004 (JP) ............... 2004-039817

(51) Int. Cl.
*G02B 6/10* (2006.01)
(52) U.S. Cl. ............... 385/129; 385/130; 385/132
(58) Field of Classification Search ......... 385/129–131
See application file for complete search history.

(56) References Cited

U.S. PATENT DOCUMENTS

| | | | | |
|---|---|---|---|---|
| 6,404,970 | B1* | 6/2002 | Gransden et al. ........... | 385/140 |
| 6,795,621 | B1* | 9/2004 | Tokushima .................. | 385/50 |
| 2002/0009277 | A1* | 1/2002 | Noda et al. ................. | 385/130 |
| 2003/0068152 | A1* | 4/2003 | Gunn .......................... | 385/129 |
| 2003/0174961 | A1* | 9/2003 | Hamada ..................... | 385/48 |
| 2004/0062505 | A1* | 4/2004 | Sugitatsu et al. .......... | 385/131 |
| 2005/0152659 | A1 | 7/2005 | Baba et al. | |
| 2005/0169591 | A1* | 8/2005 | Broeng et al. .............. | 385/129 |

FOREIGN PATENT DOCUMENTS

| | | |
|---|---|---|
| JP | 2000-121987 | 4/2000 |
| JP | 2000-224109 | 8/2000 |
| JP | 2002-333536 | 11/2002 |

OTHER PUBLICATIONS

D. Mori, et al., "Consideration on stopping of light in chirped photonic crystal waveguides", Extended Abstracts (the 64th Autumn Meeting 2003); the Japan Society of Applied Physics, 1p-ZM-14, No. 3, Aug. 30, 2003, p. 947.

D. Mori, et al., "A Study on charped photonic crystal waveguides", Extended Abstracts (the 50th Spring Meeting 2003); the Japan Society of Applied Physics and Related Societies, 28p-YN-1, No. 3, Mar. 27, 2003, p. 1130.

Takashi Sato, et al., "In-Plane Light Propagation in Ta2O5-SiO2 Autocloned Photonic Crystals", IEEE Journal of Quantum Electronics, vol. 38, No. 7, Jul. 2002, pp. 904-908.

M. Notomi, et al. "Extremely Large Group-Velocity Dispersion of Line-Defect Waveguides in Photonic Crystal Slabs", the American Physical Society; Physical Review Letters, vol. 87, No. 25, Dec. 17, 2001, pp. 253902-1-253902-4.

* cited by examiner

*Primary Examiner*—Sung Pak
*Assistant Examiner*—Tina M. Wong
(74) *Attorney, Agent, or Firm*—Oblon, Spivak, McClelland, Maier & Neustadt, P.C.

(57) ABSTRACT

An optical control element is disclosed that can be made small and has a low loss, and is able to provide group speed control and wavelength dispersion of short light pulses. The optical control element is formed from a photonic crystal, and includes a first portion having a first refraction index in the photonic crystal, a second portion having a second refraction index lower than the first refraction index, and a refraction-index-distributed type defect wave guide. A difference effective refraction indexes between the first portion and the second portion near the refraction-index-distributed type defect wave guide, changing continuously or stepwise along a wave guiding direction of the refraction-index-distributed type defect wave guide.

26 Claims, 28 Drawing Sheets

LINEAR REFRACTION INDEX DISTRIBUTION

NON-LINEAR REFRACTION INDEX DISTRIBUTION

A  B  C  D

OPTICAL CONTROL ELEMENT

BACKGROUND OF THE INVENTION

1. Field of the Invention

The present invention relates to an optical control element using a photonic crystal, and more particularly, relates to an optical control element that is able to be made compact, has high performance, and can be used in high speed/capacity optical communication and high speed optical signal processing in the field of optical transmission associated with a data transmission speed over 100 Gbps.

2. Description of the Related Art

When performing high speed and high capacity optical communication and high speed optical signal processing, optical signal pulses may spread, or the optical signals may arrive at different timings when being transmitted in a fiber, that is, dispersion or distortion occurs. This problem prevents high speed communication. To solve this problem, a device is needed for controlling the dispersion and a group speed delay of the optical pulses, which determine the optical signal arrival timing. In the related art, such devices have been developed, which utilize an optical fiber of peculiar dispersion properties. In this kind of device, light propagates in the optical fiber of peculiar dispersion property while the group delay is adjusted appropriately.

However, in the above device, a long optical fiber has to be used; for this reason, the optical control element becomes large in size, and has a low degree of freedom in the dispersion property. Due to this, it is difficult to reduce the size of the optical control device and increase the degree of integration, which are required for high level signal processing or multiple lines parallel processing.

Concerning dispersion compensation, study has been made to enable precise dispersion control and dispersion compensation by utilizing a fiber grating of a chirped structure. However, in order to achieve dispersion compensation, an optical fiber of an order of meters has to be used, hence it is difficult to reduce the size of the optical control device and increase the degree of integration. Further, because in a device including the chirped structure fiber grating, the incident light has to be reflected for use, and a circulator is needed to obtain high efficiency, hence, it is difficult to reduce the size of the optical control device and increase the degree of integration.

To solve these problems, recently and in the continuing years, dispersion or group speed delay effect given by a photonic crystal is attracting attention. In the photonic crystal, or in an optical wave guide with line defects introduced (usually referred to as a "defect wave guide"), the dispersion property, that is, a relation between the frequency and the wave number, shows some peculiarities.

For example, Japanese Laid-Open Patent Application No. 2000-121987 (referred to as "reference 1" hereinafter), and Japanese Laid-Open Patent Application No. 2000-224109 (referred to as "reference 2" hereinafter), disclose a dispersion compensation device using the photonic crystal.

However, in the dispersion compensation devices disclosed in reference 1 and reference 2, because the light propagating in the photonic crystal is not confined inside the wave guide structure, the dispersion compensation devices exhibit strong angular dependence, and have problems in reliability. Further, it is difficult to reduce the size of the dispersion compensation devices. For these reasons, these dispersion compensation devices disclosed in reference 1 and reference 2 cannot be put into practical use.

On the other hand, in the defect wave guide, it is theoretically predicted that the group speed of the light becomes zero at the edge of a Brillouin zone, which is also referred to as "band edge", and in fact, a group speed as low as 1/60 of the speed of light in a vacuum has been observed at the band edge. However, the defect wave guide usually has very large wavelength dispersion, hence, although the group speed can be decreased when short pulses of light having definite spectral widths are input, because of the large wavelength dispersion, the pulses greatly expand. For this reason, it is difficult to obtain a device for dispersion control and group speed control by using such a simple defect wave guide.

On the other hand, in a structure referred to as a "coupled defect wave guide", in which discrete dot-defects are arranged in sequence, because relatively large dispersion can be obtained in a relatively large area, and the value of the dispersion is higher than the dispersion of an optical fiber by about six orders of magnitude, the length of a fiber dispersion compensation device can be reduced from a few km due to the conventional techniques to a few mm.

For example, Japanese Laid-Open Patent Application No. 2002-333536 (referred to as "reference 3" hereinafter) discloses such a dispersion compensation device using the coupled defect wave guide.

FIGS. 40A through 40C are views of the conventional dispersion compensation device using the coupled defect wave guide as disclosed in reference 3.

As illustrated in FIGS. 40A through 40C, the dispersion compensation device includes a usual wave guide and a coupled-defect type dispersion compensation wave guide. Although it is structure-dependent, the dispersion compensation wave guide is calculated to be 20 ps/nm/mm.

However, in a slab type photonic crystal, which has been studied long before and is easy to be fabricated, if the coupled defect wave guide is formed, the period of the coupled defect wave guide in the propagation direction of the light is long, hence it is difficult to avoid a light leakage condition, known as "light-cone", consequently, a large loss of light occurs. Due to this, the photonic crystal cannot be put into practical use at all.

On the other hand, in recent years and continuing, it is proposed to use a multi-layer one-dimensional periodic structure to render light to propagate in a direction perpendicular to the films of the multi-layer structure, so as to fabricate a dispersion control device under the same principle as the coupled defect wave guide. However, in this method, the light propagates in the space but not in a wave guide, so it is difficult to reduce the size of the device and increase the degree of integration.

In contrast, as described in the Extended Abstracts, the 64th Autumn Meeting, 2003, The Japan Society of Applied Physics, p 947, 1pZM14, and in the Extended Abstracts, the 50th Spring Meeting, 2003, The Japan Society of Applied Physics, p 1130, 28pYN1, inventors of the present invention have proposed a novel chirped photonic crystal, in which the diameter of holes in a line defect wave guide is arranged to change gradually. This structure is investigated theoretically and experimentally to demonstrate that at a specific propagation frequency, the group speed becomes zero at the band edge, and it is published that it is possible to perform dispersion control and group speed control.

However, when short light pulses are input, specific dispersive wavelength components are localized in some locations, such as the holes, and because of this, the waveform of reflected light pulses spreads or distorts.

SUMMARY OF THE INVENTION

It is a general object of the present invention to solve one or more problems of the related art.

A first specific object of the present invention is to provide an optical control element having a small size and low loss and capable of group speed control of short light pulses.

A second specific object of the present invention is to provide an optical control element having a small size and low loss, and having a large dispersion control effect and a large group speed delay effect.

A third specific object of the present invention is to provide an optical control element having a small size and low loss, and having a large dispersion control effect and a large group speed delay effect, while enabling easy control of a refraction index of a constituent material and enabling easy fabrication.

A fourth specific object of the present invention is to provide an optical control element capable of dispersion control and group speed delay control in a wide frequency region with high precision.

According to a first aspect of the present invention, there is provided an optical control element formed from a photonic crystal, the optical control element including a first portion having a first refraction index in the photonic crystal; a second portion having a second refraction index lower than the first refraction index in the photonic crystal; and a refraction-index-distributed type defect wave guide. A difference of effective refraction indexes between the first portion and the second portion changes continuously along a wave guiding direction of the refraction-index-distributed type defect wave guide.

As an embodiment, the refraction-index-distributed type defect wave guide generates a band having a band edge in a photonic bandgap with respect to a wavelength of light guided in the refraction-index-distributed type defect wave guide.

As an embodiment, the change of the difference between the effective refraction index of the first portion and the effective refraction index of the second portion is generated from a change of a structure of the photonic crystal.

As an embodiment, the optical control element includes a thin film having a thickness changing along the wave guiding direction.

As an embodiment, the refraction-index-distributed type defect wave guide includes a portion having an increasing difference of the effective refraction indexes, and a portion having a decreasing difference of the effective refraction indexes.

As an embodiment, a lattice arrangement of the photonic crystal near the refraction-index-distributed type defect wave guide is distorted, and the distortion changes along the wave guiding direction of the refraction-index-distributed type defect wave guide.

As an embodiment, the photonic crystal includes holes, and a ratio of a radius (r) of one of the holes to a pitch (a) of the holes changes along the wave guiding direction near the refraction-index-distributed type defect wave guide. Alternatively, the photonic crystal includes holes, and a pitch (a) of the holes changes along the wave guiding direction near the refraction-index-distributed type defect wave guide.

As an embodiment, the optical control element includes a photonic crystal defect structure near the refraction-index-distributed type defect wave guide and able to be connected to the refraction-index-distributed type defect wave guide.

As an embodiment, in the optical control element, the photonic crystal defect structure includes an intermediate connection defect structure able to be connected to the refraction-index-distributed type defect wave guide, and a photonic crystal connection defect structure able to be connected to the intermediate connection defect structure.

As an embodiment, the photonic crystal connection defect structure includes a connection defect wave guide formed from a defect wave guide.

As an embodiment, the connection defect wave guide is coupled by a directional coupler.

As an embodiment, the connection defect wave guide is a second refraction-index-distributed type defect wave guide different from said refraction-index-distributed type defect wave guide.

As an embodiment, each of said two refraction-index-distributed type defect wave guides generates a band having a band edge in the photonic bandgap, and the bands of said two refraction-index-distributed type defect wave guides overlap with each other near the band edges.

As an embodiment, the bands of said two refraction-index-distributed type defect wave guides in the photonic bandgaps thereof are on opposite sides of the band edge.

As an embodiment, the bands of said two refraction-index-distributed type defect wave guides in the photonic bandgaps thereof are nearly symmetric relative to the band edge near the band edge.

As an embodiment, the bands of said two refraction-index-distributed type defect wave guides in the photonic bandgaps thereof are on the same side of the band edge near the band edge.

As an embodiment, the bands of said two refraction-index-distributed type defect wave guides in the photonic bandgaps thereof are partially approximately the same near the band edge.

As an embodiment, the optical control element further includes a dispersion compensation correction element on an incident side or an outgoing side of the refraction-index-distributed type defect wave guide.

As an embodiment, the dispersion compensation correction element includes a photonic crystal defect wave guide.

As an embodiment, the dispersion compensation correction element includes a dispersion compensation correction variable unit configured to variably control a correction to the dispersion compensation.

As an embodiment, the optical control element further includes an optical control unit operating by means of a non-linear optical effect in the refraction-index-distributed type defect wave guide. Alternatively, the optical control element further includes an optical control unit operating by means of an electro-optical effect in the refraction-index-distributed type defect wave guide. Alternatively, the optical control element further includes an optical control unit operating by means of a magnetic-optical effect in the refraction-index-distributed type defect wave guide.

As an embodiment, the optical control element further includes a temperature control unit that controls a temperature of the refraction-index-distributed type defect wave guide.

According to a second aspect of the present invention, there is provided an optical control element formed from a photonic crystal. The optical control element includes a first portion having a first refraction index in the photonic crystal; a second portion having a second refraction index lower than the first refraction index in the photonic crystal; and a refraction-index-distributed type defect wave guide. A difference of refraction indexes between the first portion and the second portion changes continuously along a wave guiding direction of the refraction-index-distributed type defect wave guide.

According to a third aspect of the present invention, there is provided an optical control element formed from a photonic crystal. The optical control element includes a first portion having a first refraction index in the photonic crystal; a second portion having a second refraction index lower than the first refraction index in the photonic crystal; and a refraction-index-distributed type defect wave guide. A difference between an effective refraction index of the first portion and an effective refraction index of the second portion changes stepwise along a wave guiding direction of the refraction-index-distributed type defect wave guide.

According to a fourth aspect of the present invention, there is provided an optical control element formed from a photonic crystal. The optical control element includes a first portion having a first refraction index in the photonic crystal; a second portion having a second refraction index lower than the first refraction index in the photonic crystal; and a refraction-index-distributed type defect wave guide. A difference between the refraction index of the first portion and the refraction index of the second portion changes stepwise along a wave guiding direction of the refraction-index-distributed type defect wave guide.

According to the present invention, it is possible to provide an optical control element that can be made small and has a low loss, and is capable of group speed control and wavelength dispersion control with short pulsed light.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

First Embodiment

Figure 1:
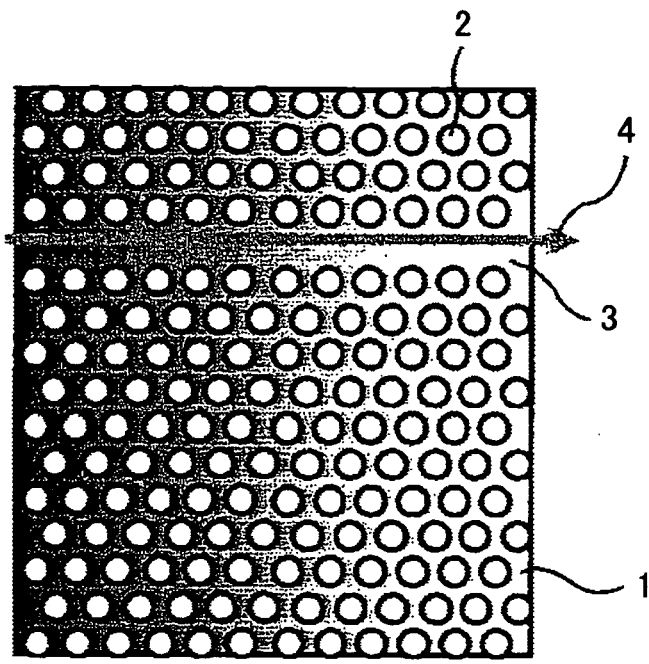
FIG. 1 is a schematic view of an optical control element formed from a slab type two-dimensional photonic crystal according to a first embodiment of the present invention.

FIG. 1 is a schematic view of an optical control element formed from a slab type two-dimensional photonic crystal according to a first embodiment of the present invention.

The optical control element shown in FIG. 1 includes a thin film 1 having a distributed refraction index, photonic crystal holes 2, and a defect wave guide 3. As shown in FIG. 1, light 4 is guided by the defect wave guide 3. In FIG. 1, the photonic crystal includes the thin film 1 formed from a material having a high refraction index and holes 2 formed from a material having a low refraction index. In addition, in FIG. 1, the left portion of the thin film 1 has a relatively high refraction index, and the right portion of the thin film 1 has a relatively low refraction index. The refraction index of the thin film 1 is arranged so that the refraction index of the material of the thin film 1 and the holes 2, or the difference of the effective refraction indexes between the thin film 1 and the holes 2, varies continuously in a direction of the guide path of light 4 in the defect wave guide 3, where the holes 2 do not exist.

In FIG. 1, the high refraction index portion and the low refraction index portion are shown in different gray levels, and the high refraction index portion is shown in a high gray level, and the low refraction index portion is shown in a low gray level. The following figures are represented in the same manner.

Figure 2:
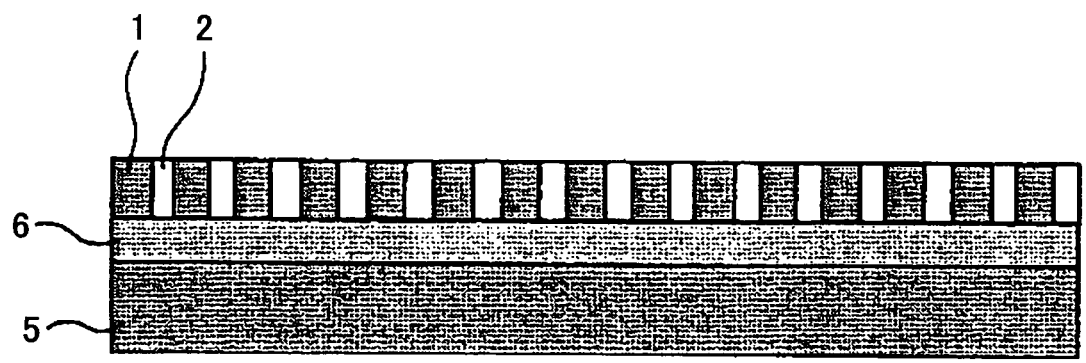
FIG. 2 is a cross-sectional view of the optical control element in FIG. 1 formed from a slab type two-dimensional photonic crystal.

FIG. 2 is a cross-sectional view of the optical control element in FIG. 1 formed from a slab type two-dimensional photonic crystal.

The optical control element shown in FIG. 2 includes the thin film 1 having a distributed refraction index, the photonic crystal holes 2, a substrate 5, and an under clad layer 6. In FIG. 2, the holes 2 are formed in cylindrical shape perpendicular to the surface direction of the thin film 1, and the upper portion of each hole 2 is open.

The under clad layer 6 is formed from a material having a refraction index lower than that of the thin film 1, and acts as a component of a wave guide layer with the thin film 1 as a core layer. The substrate 5 is provided below the under clad layer 6. In the structure of the photonic crystal shown in FIG. 2, the thin film 1 is basically the same as a slab type two-dimensional photonic crystal of the related art, except that the thin film 1 has the distributed refraction index, and the thin film 1, that is, a slab type two-dimensional photonic crystal, can be formed by fine processing techniques of the related art.

Below, an explanation is given of an operation of optical control by the optical control element formed from the slab type two-dimensional photonic crystal according to the present embodiment.

First, an explanation is made of optical control by a slab type photonic crystal in the related art. Generally, it is known that in a photonic crystal, which is a material having a refraction index that periodically varies at a period of the same order of the wavelength of the incident light, there exist some regions where photons do not exist, and these regions are referred to as "photonic bandgaps".

Figure 3A:
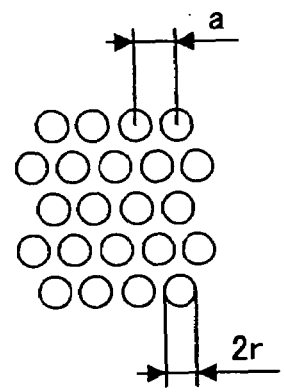
FIG. 3A and FIG. 3B are views illustrating a periodic arrangement of a usual photonic crystal without defects.
Figure 3B:
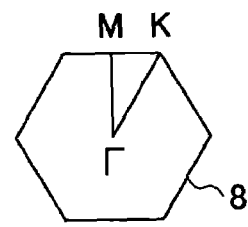

FIG. 3A and FIG. 3B are views illustrating the periodic arrangement of a usual photonic crystal without defects, where FIG. 3A shows the period and diameter of the photonic crystal holes 2 in the real space, which are structural features of the photonic crystal, and FIG. 3B shows the relation corresponding to the periodical structure in FIG. 3A in the wave number space instead of the real space.

In FIG. 3A, the period of the photonic crystal holes 2 is represented by "a", and the radius of the photonic crystal holes 2 is represented by "r". the periodic arrangement in the real space shown in FIG. 3A possesses a triple rotational symmetry, forming a Brillouin zone 8, which has a hexagonal structure of a triple rotational symmetry, as illustrated in FIG. 3B below. In the Brillouin zone 8, a direction in which the holes are gathered and form a straight line is indicated as "Γ-K direction", and an intermediate direction is indicated as "Γ-M direction".

Figure 4:
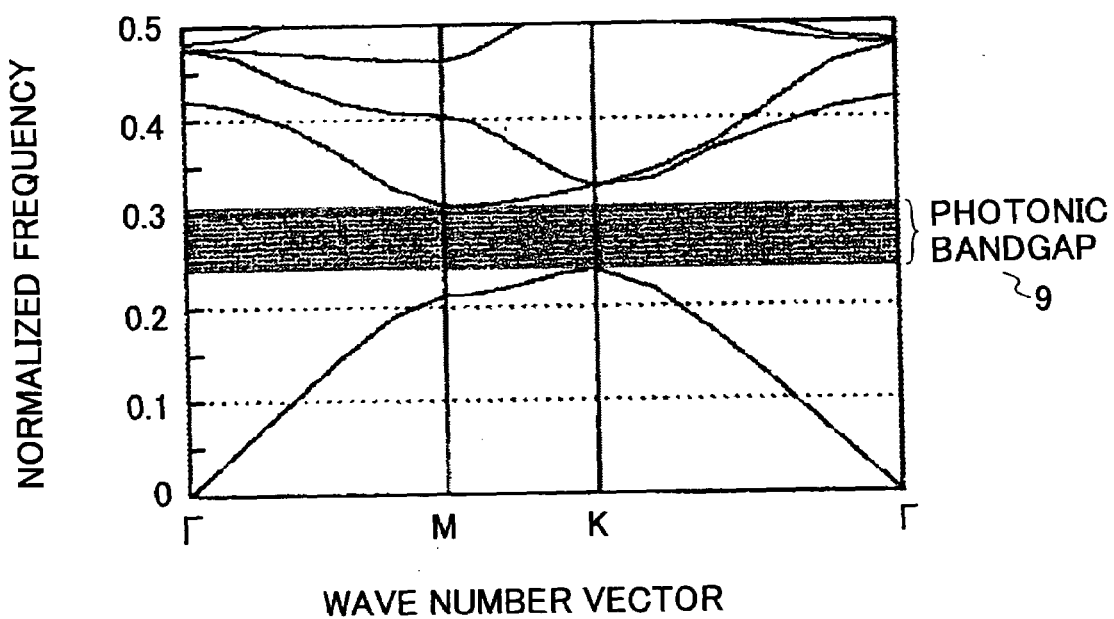
FIG. 4 is a diagram of bands of a photonic crystal without defects.

FIG. 4 is a diagram of bands of a photonic crystal without defects as shown in FIGS. 3A and 3B, allowing light propagation in the photonic crystal.

In FIG. 4, the abscissa represents a wave number vector k in the Γ-K direction and Γ-M direction. The graphs in FIG. 4 are obtained by calculations by means of two-dimensional plane wave expansion, by assuming that the two-dimensional photonic crystal has the triangular arrangement as shown in FIG. 3A, the refraction index of the thin film 1 is 3.0, the refraction index of the photonic crystal hole 2 is 1.0, and the ratio r/a equals 0.30.

The ordinate represents a normalized angular frequency ωN of the light to be propagated, which is obtained by normalizing the angular frequency ω of the light. The wave number vector k reflects the propagation property of light in a periodic structure. The normalized angular frequency ωN is dimensionless, and satisfies $\omega N = \omega a / 2\pi c$, where, c is the speed of light in a vacuum.

From the equation, it is clear that ωN is equivalent to a/λ, where, λ is the wavelength of the incident light. That is, the normalized angular frequency ωN is equivalent to a ratio of the period (a) of the arrangement of the photonic crystal holes 2 to the wavelength of the light. Under this condition, as shown in FIG. 4, the normalized angular frequency ωN is approximately in a range from 0.25 to 0.3, and a band appears in a region 9, in which no wave number exists. This region 9 is referred to as a "photonic bandgap".

The photonic bandgap has a property that when light having a frequency corresponding to the photonic bandgap is incident on the photonic crystal at a certain direction, the light is always reflected. Therefore, the photonic crystal cannot be used as an optical control element except for a reflection use.

However, by introducing defects in the periodical structure of the photonic crystal having a photonic bandgap, a band related to propagation modes corresponding to the defects appears in the photonic bandgap, and when light having a frequency corresponding to a certain defect is appropriately incident, the photonic crystal can be used as an optical control element. The defects are referred to as "dot defects" when the defects are constituted by hole defects, and "line defects" when the defects are constituted by plural continuous defects. When line defects are formed in the photonic crystal, a wave guide, referred to as a "defect wave guide", may be formed for guiding light having a specific frequency through the line defects. The defect wave guide, which has bands in the original photonic bandgap, is quite different from a usual wave guide which guides light by means of the total reflection, but has various peculiar light propagation properties specific to the photonic crystal.

Figure 5:
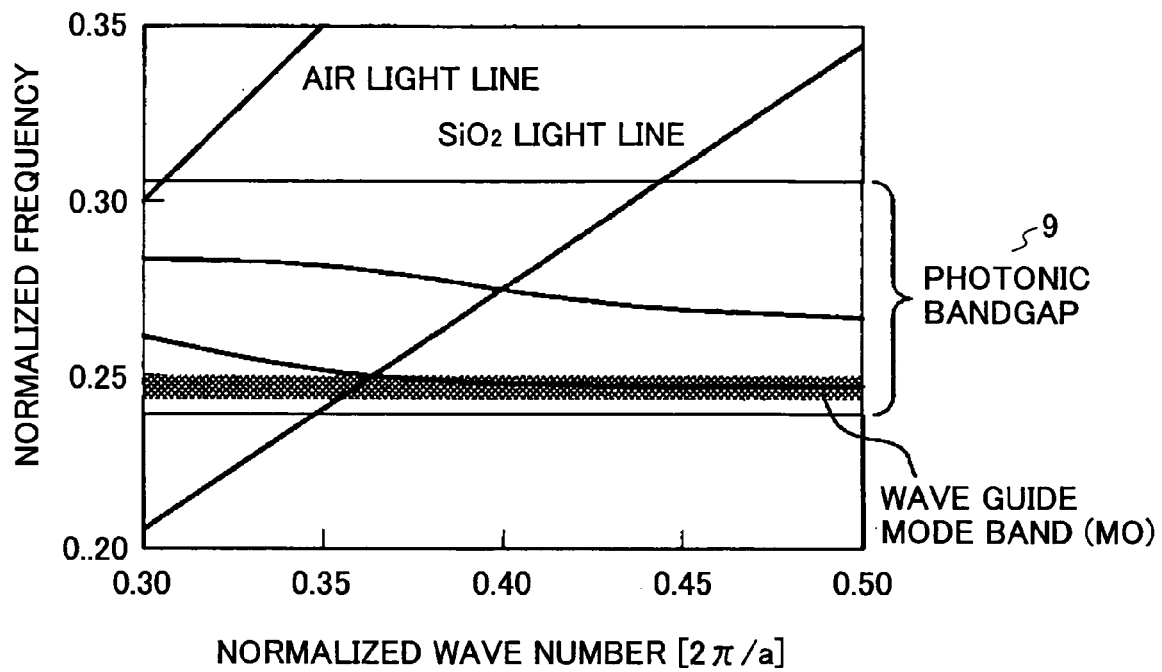
FIG. 5 is a diagram of bands of the photonic crystal having the defect wave guide in the present embodiment.

FIG. 5 is a diagram of bands of the photonic crystal having the defect wave guide according to the present embodiment. Shown in FIG. 5 is a portion of an enlarged band diagram of the photonic crystal.

As shown in FIG. 5, the band diagram of a defect wave guide occurring due to a simple one sequence of the line defect is obtained by calculations on the photonic crystal having the same structure as in FIG. 4, by means of two-dimensional plane wave expansion, while assuming that the defect wave guide is formed due to a simple one sequence of the line defect. The other factors are the same as those described with reference to FIG. 4. In FIG. 5, however, the abscissa represents a normalized wave number vector having a unit of (2π/a), and because of the replicating of the Brillouin zone, in a specific direction of the wave number vector, the maximum is normalized to be 0.5. In FIG. 5, there are two bands that appear in a region of the photonic bandgap with the normalized angular frequency ωN to be about 0.25 to 0.3. These two bands allow light to be guided only along the defect wave guide in the photonic crystal. Assuming the normalized angular frequency ωN of light having a certain frequency is found, and a horizontal line passing this ωN is drawn, if the horizontal line crosses with the aforesaid two bands, it means that light of the certain frequency can be guided along the defect wave guide. In addition, light lines indicating the propagation states of light in the air and in the $SiO_2$ under clad respectively are also illustrated in FIG. 5.

As shown by the light lines, the light propagating in the defect wave guide is quite different in light guide behavior from light propagating in a usual wave guide or vacuum. For example, if its propagation speed is represented as a group speed Vg of the light, which corresponds to a first-order derivative of the band, it is found that the propagation speed greatly depends on the frequency of the light, and the magnitude of the propagation speed is small.

The band corresponding to light propagation in the air is indicated by a band having a slope equaling one, which is referred to as "air cone". A slope equaling one corresponds to the speed of light propagating in the air, that is, in nearly a vacuum.

On the other hand, as illustrated in FIG. 5, in the band in the lower part in FIG. 5 (indicated by MO), when the normalized wave number is near 0.4, an absolute value of a slope of the band, namely, a derivative of the band, is less than 0.1, indicating a speed of the light is 10-fold slower than the that in the vacuum.

Because if the refraction index of the original constituent material is 3.0, the propagation speed of the light in the original material in bulk state is three times as that in a vacuum, therefore, the propagation speed of the light can be lowered by three times or more, and as a result, the photonic crystal can be used as an optical control element for delaying the group speed. Further, the propagation speed of the light can be lowered by several tens of times or more relative to that in a vacuum when the normalized wave number is near 0.5. In addition, because the band slope changes greatly depending on the frequency of the light, the dispersion with respect to the frequency of the light is very large, and depending on the situation, the photonic crystal can be used as an optical control element for enhancing frequency dispersion or wavelength dispersion.

However, as for the delay element formed from the optical control element using the photonic crystal of the related art, the wavelength dispersion has a fixed value uniquely determined by the photonic crystal structure and the frequency of the light, and has little practical use. In addition, the defect wave guide having a slow group speed has a large reflectivity for the light entering to the defect wave guide from the outside; thereby, the utilization efficiency of the light declines.

In the first embodiment of the present invention as shown in FIG. 1, different from the photonic crystal of the related art, whose refraction index periodically varies at a period of the same order of the wavelength of the incident light, it is possible to attain an optical control element using a novel photonic crystal which does not have a periodicity of the same order of the wavelength of the incident light in the light guide direction.

Specifically, in the photonic crystal according to the first embodiment of the present invention, the thin film 1 having a distributed refraction index is used, and photonic crystal holes 2 are formed in the thin film 1, thereby, forming the slab type two-dimensional photonic crystal having a distributed refraction index. In addition, in the slab type two-dimensional photonic crystal having a distributed refraction index, the defect wave guide is formed from the line defects. Under this condition, the relative position coordinates of the holes 2 form triangular arrangements which have the same periodicity as the photonic crystal of the related art. Further, the thin film 1 is formed to have a distributed refraction index so that the refraction index decreases continuously only in the wave guide direction of the light 4 propagating in the defect wave guide 3.

Consequently, because the difference of the refraction indexes between the air in the hole and the thin film decreases continuously and gradually along the wave guide direction in which the light propagates, the refraction index does not show a periodicity of the same order of the wavelength of the incident light in the light guide direction. Namely, the light path length between centers of two adjacent holes, which is equivalent to a period, is not fixed but decreases continuously and gradually, because the refraction index of the thin film 1 between two adjacent holes decreases continuously and gradually; hence, the photonic crystal according to the present embodiment does not have an optical periodicity. It should be noted that, different from the defects in the photonic crystal of the related art, and the resulting lack of periodicity, which can be attributed to a dot defect structure, or a line defect structure, or a partially distorted structure, in the present embodiment, the lack of periodicity means that the refraction index of a certain region does not exhibit periodicity.

By simulations using FDTD, it is found that the structure including plural holes in a refraction index distributed photonic crystal possesses the same photonic bandgap as in the photonic crystal of the related art, and possesses bands corresponding to a defect wave guide existing in the photonic bandgap. This structure is one type of the photonic crystal, and is a refraction index distributed photonic crystal.

Analogous to a graded material in the field of material science, which does not have a definite physical property, the refraction index distributed photonic crystal according to the present embodiment does not have a definite optical property, and the optical property changes continuously along the light guide direction. Utilizing the characteristics of the refraction index distributed photonic crystal, the present invention provides an optical control element formed from the refraction index distributed photonic crystal for performing dispersion control, group speed control, and transmission rate/reflectivity control in manners different from the photonic crystal of the related art having a definite optical property. By controlling the refraction index distribution, a band related to the light being guided of a certain frequency can be shifted while guiding the light. Hence, it is possible to provide a compact optical control element resulting in a low loss, a large dispersion control effect and a large group speed delay effect.

In the present invention, because the wave guide state determined by the band of the photonic crystal changes in the course of the light guide along with the frequency of the light being guided, the group speed of the light being guided in the defect wave guide can be changed, and by using this result, the dispersion state can be controlled. The refraction index distribution is defined relative to the width of the frequency of the incident light so as to result in a sufficiently large frequency width corresponding to a change of the bands at the two ends of the defect wave guide in the refraction index distributed photonic crystal. Thus, it is possible to make the group speed difference caused by the frequency difference greater than the group speed difference directly related to the original frequency difference.

In addition, in the present embodiment, because the wave guide state determined by the band of the photonic crystal changes in the course of the light guide along with the frequency of the light being guided, the group speed of the light being guided in the defect wave guide can be changed. In FIG. 1, the group speed of the light on the incidence side is large, and the group speed of the light on the outgoing side is small. By using this fact, although not illustrated, it is possible to provide an optical control element formed from the refraction index distributed photonic crystal having two different group speed properties by making the two group speeds in agreement, hence realizing high light utilization efficiency.

In addition, in the present embodiment, when forming an optical control element having an optical delay effect due to a delay of the group speed of the photonic crystal, it is possible to improve light incident coupling efficiency on the photonic crystal, and realize an optical control element of high light utilization efficiency. The photonic crystal of the related art, which has a group speed reduced to be very small, basically has a high reflectivity, the same as a one-dimensional photonic crystal having a DBR structure. To the contrary, in the optical control element of the present embodiment, because the group speed of the light on the incidence side is high, the reflectivity can be reduced, and the group speed decreases continuously while light is being guided, it is possible to have a light guide state at a low group speed despite a low reflectivity.

In the present embodiment, the aforementioned continuously changing difference of the refraction index corresponds to the difference of refraction indexes or the difference of effective refraction indexes of a high-refraction-index portion and a low-refraction-index portion, which are indispensable components of a photonic crystal. Here, the effective refraction index corresponds to a refraction index defined by considering effects of practically received actions, for example, with the wave guide or the thin film as an example, the light is influenced by not only the material but also the structure. For example, concerning a thin film of the same of order of the wavelength, by reducing the thickness of the thin film, the effective refraction index becomes less than the original refraction index of a bulk material. In addition, the effective refraction index also becomes small when fine air structures, each having a size less than $1/10$ of the wavelength, are provided in the thin film.

The difference of the effective refraction index corresponds to either of a difference of the refraction index due to changes of materials, a difference of the refraction index due to changes of structures, or a combination of the differences of the refraction index due to changes of materials and structures.

Instead of arranging the thin film 1 to have a continuously changing refraction index, when the holes 2 are filled with dielectric materials and the refraction index of the thin film 1 is fixed, it is also possible to attain an effective refraction index changing continuously if the refraction indexes of the materials constituting the holes 2 change continuously. Alternatively, an effective refraction index changing continuously can also be obtained if the refraction indexes of both the materials of the holes 2 and the thin film 1 are arranged to change continuously.

Further, the present embodiment is not limited to an effective refraction index changing continuously only in the wave guide direction, but similar effects can also be achieved when the effective refraction index changes continuously or stepwise in other directions.

In addition, the present embodiment is not limited to an optical control element using a slab type two-dimensional photonic crystal having a hole-structure, but is also applicable to the defect wave guide in a pillar type two-dimensional photonic crystal, and the defect wave guide in a three-dimensional photonic crystal, resulting in large dispersion control effect and group speed delay effect. An optical control element using the pillar type two-dimensional photonic crystal or the three-dimensional photonic crystal also shows very good performance.

Second Embodiment

Below, the second embodiment of the present invention is explained with reference to FIG. 6 and FIGS. 7A and 7B. In the present embodiment, the same reference numbers are used for the same elements as those in the previous embodiment.

Figure 6:
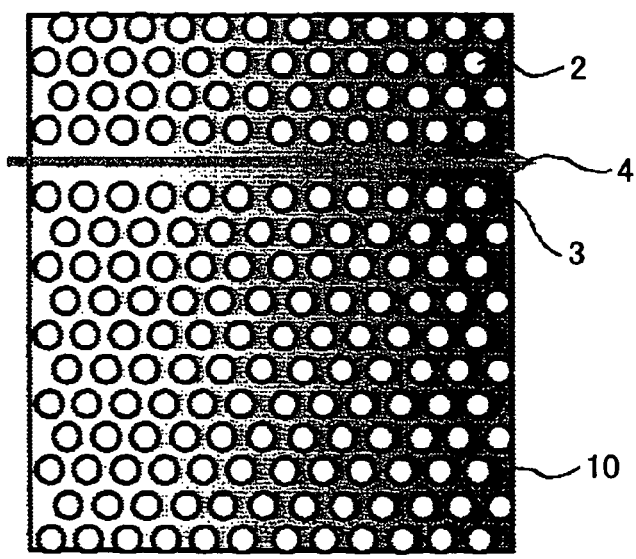
FIG. 6 is a schematic view of an optical control element formed from a slab type two-dimensional photonic crystal according to a second embodiment of the present invention.

FIG. 6 is a schematic view of an optical control element formed from a slab type two-dimensional photonic crystal according to the second embodiment of the present invention.

The optical control element shown in FIG. 6 includes a thin film 10 having a distributed refraction index, photonic crystal holes 2, and a defect wave guide 3. As shown in FIG. 6, light 4 is guided by the defect wave guide 3. In FIG. 6, the photonic crystal includes the thin film 10 formed from a material having a high refraction index and holes 2 formed from a material having a low refraction index. Furthermore, in FIG. 6, the left portion of the thin film 10 has a relatively high refraction index, and the right portion of the thin film 10 has a relatively low refraction index. The refraction index of the thin film 10 is arranged so that the difference of the effective refraction indexes between the thin film 10 and the holes 2 varies continuously in a wave guide direction of the light 4 in the defect wave guide 3 where the holes 2 do not exist.

The present embodiment is not limited to the case in which the effective refraction index of the thin film 10 decreases in the propagation direction of the light being guided. As shown in FIG. 6, when the light is incident to the defect wave guide, the difference of the effective refraction index of the photonic crystal decreases continuously, thereby the band corresponding to the defect wave guide can be shifted, with the same wave number, to a low frequency end, while the light is being guided in the defect wave guide. By shifting the band to a low frequency end, band states are changed with respect to the light lines of the air and the $SiO_2$ under clad, and it is possible to control divergent light from the slab type two-dimensional photonic crystal.

Figure 7A:
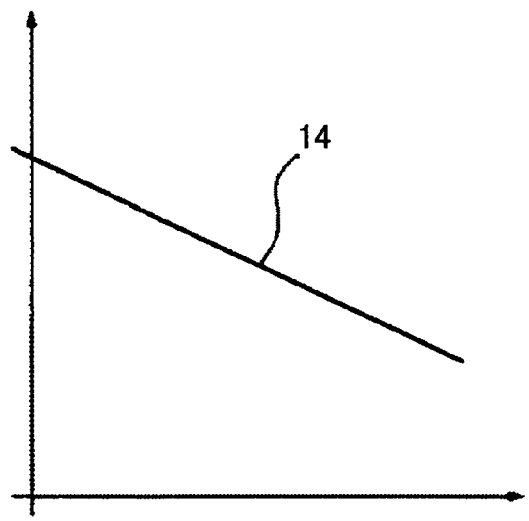
FIG. 7A schematically shows an example of the difference of the effective refraction index of an optical control element formed from a slab type two-dimensional photonic crystal according to the second embodiment of the present invention.

FIG. 7A schematically shows an example of the difference of the effective refraction index of an optical control element formed from a slab type two-dimensional photonic crystal according to the second embodiment of the present invention.

In FIG. 7A, the abscissa represents spatial relative positional coordinates in the direction of the defect wave guide, the ordinate represents a difference of the effective refraction index. As shown by a straight line 14 in FIG. 7A, the difference of the effective refraction index linearly decreases.

Figure 7B:
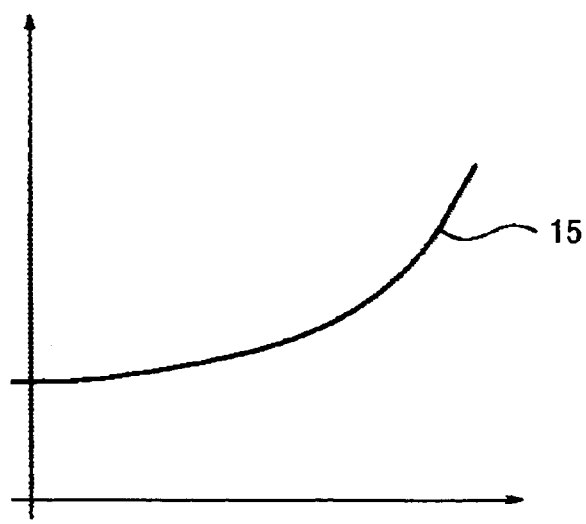
FIG. 7B schematically shows another example of the difference of the effective refraction index.

FIG. 7B schematically shows another example of the difference of the effective refraction index.

Similar to FIG. 7A, in FIG. 7B, the abscissa represents spatial relative positional coordinates in the direction of the defect wave guide, and the ordinate represents the difference of the effective refraction index.

As shown by a curve 15 in FIG. 7B, the difference of the effective refraction index non-linearly increases. Due to the non-linear variation of the difference of the effective refraction index, it is possible to perform group speed control with high precision.

Materials having refraction indexes as shown in FIG. 7A and FIG. 7B can be obtained, for example, by forming a thin film on a substrate in a direction perpendicular to the substrate, by diffusing specific elements from an end of the substrate, by controlling doses of light or an electromagnetic wave irradiating on a material having a refraction index variable with the light or electromagnetic wave, by controlling doses of incident ions during ion implantation, by cutting an organic material or an in-organic material that has a distributed refraction index into slices, or by polishing the organic material or the in-organic material having a distributed refraction index into thin films.

Because it is sufficient that the effective refraction index of the thin film 10 is distributed, the same effect of the present embodiment can be achieved not only by changing the refraction index of the material of the thin film 10 but also by changing the refraction index of the materials of the under clad layer or other peripheral members surrounding the thin film 10.

Further, because it is not necessary to fix the refraction index to a specific value, and the refraction index can be actively controlled by an electro-optical effect, by a non-linear optical effect, by a change of the temperature, by an external signal, or automatically, it is possible to realize effective dispersion control or group speed control.

The optical control element of the present embodiment can be used in an optical memory device, an optical modulation device, an optical delay device, an optical dispersion compensation device, an optical amplification device, an optical computing device, an optical wavelength conversion device, a magnetic-optical information conversion device, a light reception device, an optical bio-device, and greatly improves performance and greatly reduces sizes of the devices. Further, by installing these devices in an optical memory system, an optical communication system, an optical data transmission system used within an office, an apparatus or a chip, an optical amplification system, an optical computing system, or an optical wavelength conversion system, it is possible to greatly improve performance and greatly reduce sizes of the systems.

Third Embodiment

Below, the third embodiment of the present invention is explained with reference to FIG. 8. In the present embodiment, the same reference numbers are used for the same elements as those in the previous embodiments.

Figure 8:
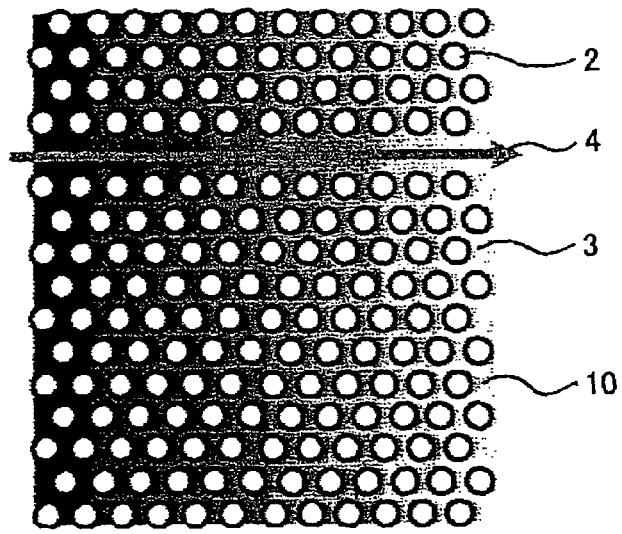
FIG. 8 is a schematic view of an optical control element formed from a slab type two-dimensional photonic crystal according to a third embodiment of the present invention.

FIG. 8 is a schematic view of an optical control element formed from a slab type two-dimensional photonic crystal according to the third embodiment of the present invention.

The optical control element shown in FIG. 8 includes a thin film 10 having a distributed refraction index, photonic crystal holes 2, and a defect wave guide 3. As shown in FIG. 8, light 4 is being guided by the defect wave guide 3. In FIG. 8, the photonic crystal includes the thin film 10 formed from a material having a high refraction index and holes 2 formed from a material having a low refraction index. Furthermore, in FIG. 8, the left portion of the thin film 10 has a relatively high refraction index, and the right portion of the thin film 10 has a relatively low refraction index. The refraction index of the thin film 10 is arranged so that the difference of the effective refraction indexes between the thin film 10 and the holes 2 decreases stepwise in a wave guide direction of the light 4 in the defect wave guide 3 where the photonic crystal holes 2 do not exist. Such a thin film 10 can be obtained by using a number of different material compositions, and arranging the effective refraction index of the materials decreasing stepwise. In FIG. 8, it is exemplified that the effective refraction index has eight steps. Of course, the present embodiment is not limited to this number.

In FIG. 8, the stepwise change of the difference of the effective refraction indexes between the thin film 10 and the holes 2 implies that the photonic crystal lacks some bands in some states.

The bands of the photonic crystal change continuously along the wave guide direction. This can be microscopically explained in the following way. Thin films are formed in small regions each having a definite refraction index, and these small regions are arranged adjacent to each other so that the overall refraction index slightly increases and decreases. Further, with three or more such kinds of structures arranged successively, a thin film 10 can be obtained in which the effective refraction index thereof increases or decreases stepwise. In this procedure, it is important that each small region having a definite refraction index be sufficiently small so that the bands of the photonic crystal change continuously along the wave guide direction. It is preferable that the length of each small region in the wave guide direction be as small as possible, and it is more preferable that the length of each small region in the wave guide direction be less than half of the wavelength of the incident light. Realizing the variation of the refraction index with separate small regions facilitates control of the refraction indexes of the constituent materials, it is possible to provide an optical control element that can be fabricated easily.

Even when the length of each small region in the wave guide direction is equal to or several times the wavelength of the incident light, or when the stepwise increase or decrease repeats over a number of the small regions, as long as the bands of the photonic crystal change nearly continuously along the wave guide direction, and nearly the same effects are achievable as those when the length of the small region in the wave guide direction is less than the wavelength of the incident light, the length of the small region in the wave guide direction can be set larger.

Fourth Embodiment

Below, the fourth embodiment of the present invention is explained with reference to FIG. 9 through FIG. 12. In the present embodiment, the same reference numbers are used for the same elements as those in the previous embodiments.

Figure 9:
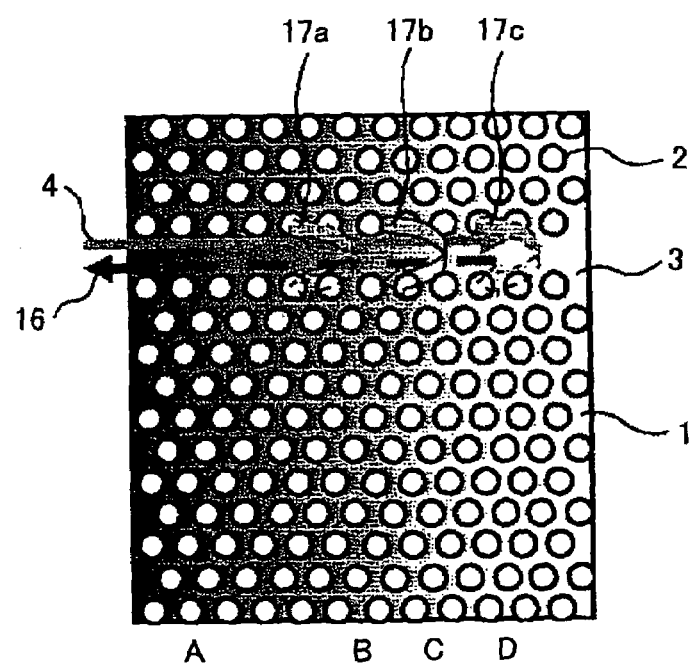
FIG. 9 is a schematic view of an optical control element formed from a slab type two-dimensional photonic crystal according to a fourth embodiment of the present invention.

FIG. 9 is a schematic view of an optical control element formed from a slab type two-dimensional photonic crystal according to the fourth embodiment of the present invention.

In FIG. 9, letters A, B, C, D indicate relative positions in a light propagation direction.

The optical control element shown in FIG. 9 includes a thin film 1 having a distributed refraction index, photonic crystal holes 2, and a defect wave guide 3. As shown in FIG. 9, light 4 is being guided by the defect wave guide 3. The reference number 16 indicates the reflection light of the incident light 4, and the reference numbers 17a, 17b, 17c indicate three typical positions where light of three different frequencies are reflected, respectively.

In FIG. 9, the photonic crystal includes the thin film 1 formed from a material having a high refraction index and the holes 2 formed from a material having a low refraction index. Furthermore, in FIG. 9, the left portion of the thin film 1 has a relatively high refraction index, and the right portion of the thin film 1 has a relatively low refraction index. The refraction index of the thin film 1 is arranged so that the difference of the effective refraction indexes between the thin film 1 and the holes 2 varies continuously in a wave guide direction of the light 4 in the defect wave guide 3 where the photonic crystal holes 2 do not exist.

Under the above conditions, the thin film 1 is formed to be a photonic crystal having a distributed refraction index in which the difference of the effective refraction indexes between the thin film 1 and the holes 2 is sufficiently large so that there is a position to locate edges of the band corresponding to the defect wave guide at the wavelength of the light being guided in the defect wave guide 3. As a result, as illustrated in FIG. 9, the light 4, which has a predetermined band width and enters the defect wave guide 3 from the left side in FIG. 9 has group speeds Vg approximately equaling zero at positions in the photonic crystal corresponding to the band edges for each of the frequencies, being in a reflection state relative to the light 4 being guided. Due to this, the incident light 4 being guided becomes the light 16. The state with a group speed Vg equaling zero indicates that the light is localized, namely, the incident light 4 does not propagate. This is an ideal optical delay effect. Specifically, as illustrated in FIG. 9, which shows the situation in which light of three different frequencies enters the defect wave guide, when the group speed Vg equals zero, at the reflection positions B, C, D, the reflection at each of the frequencies is performed according to the corresponding frequency, as shown by 17a, 17b, and 17c.

Therefore, the optical control device shown in FIG. 9 has a structure capable of producing a state corresponding to a group speed Vg equaling zero, and the group speed decreases continuously toward this state. Due to this, it is possible to realize an optical control element formed from the photonic crystal that can be made small and has an optical delay effect. This is achieved by utilizing localization and reflection of uniform light in a wide frequency region. By appropriately setting the refraction index distribution and the wave guide distance of the photonic crystal, a reflecting-type optical control device can be obtained that is able to generate a very large dispersion and group speed delay. For example, in a very short distance from about 10 μm to 100 μm, a light delay from about 1 ps to about 10 ps can be obtained. In fact, with a delay of about 1 ps, the light is essentially stagnated.

Figure 10:
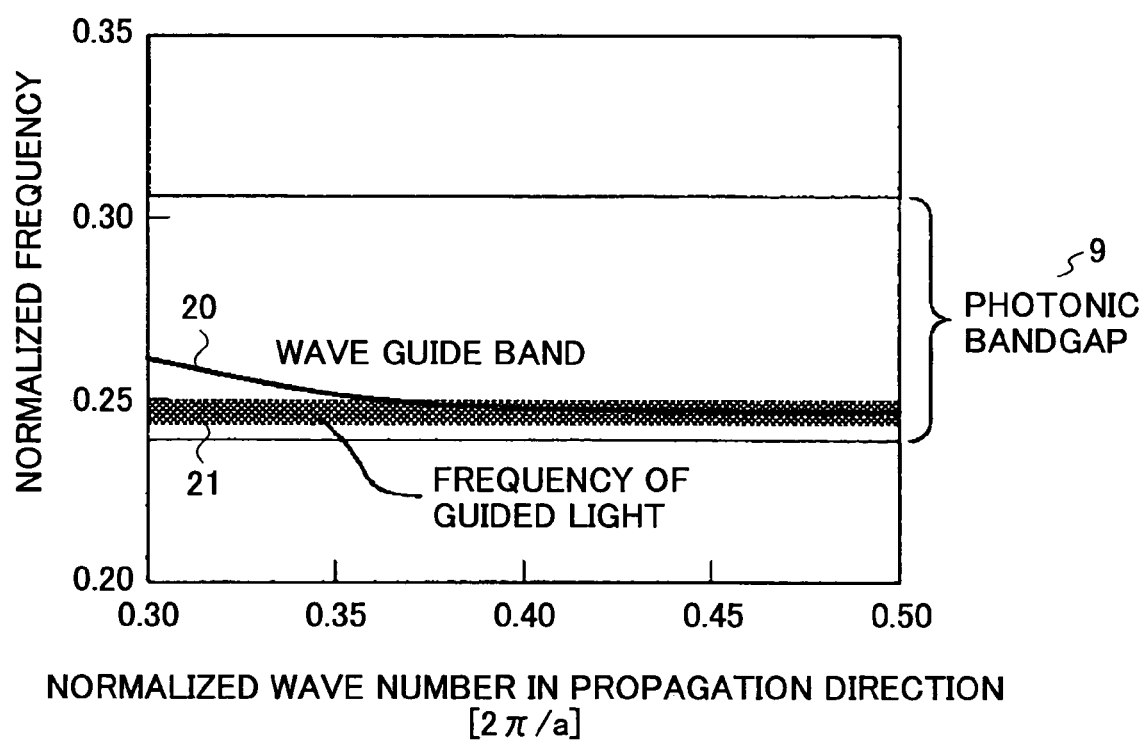
FIG. 10 is a band diagram of the photonic crystal having a distributed refraction index.
Figure 11A:
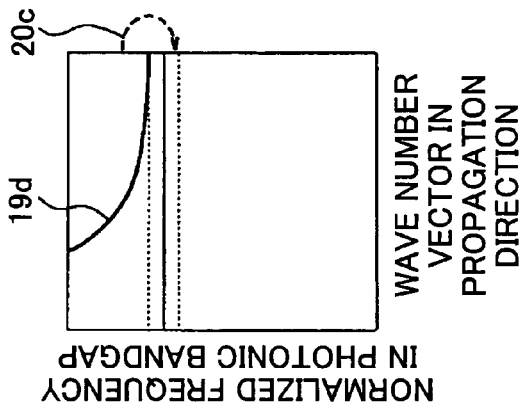
FIGS. 11A through 11D schematically illustrate light propagation states of the refraction index distributed photonic crystal of the present embodiment as shown in FIG. 9 and FIG. 10.
Figure 11B:
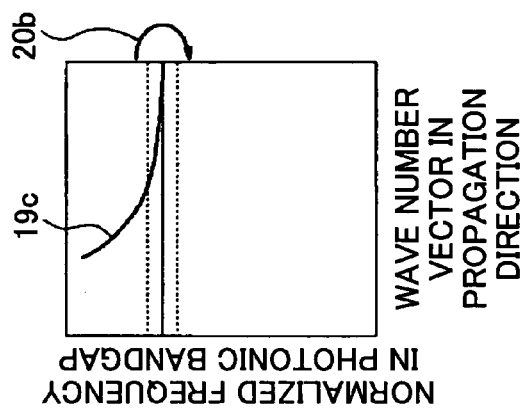
Figure 11C:
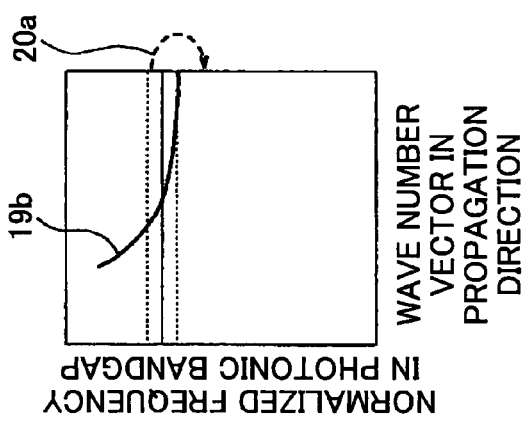
Figure 11D:
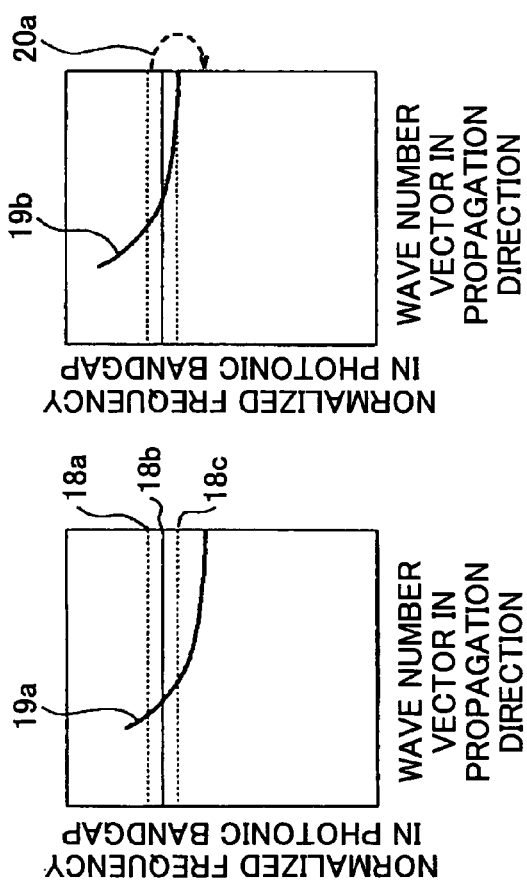

FIG. 10 is a diagram of bands of the photonic crystal of the present embodiment.

FIG. 10 shows a band diagram of the photonic crystal corresponding to specific positions in the wave guide direction in the photonic crystal having a distributed refraction index.

The photonic crystal having a distributed refraction index does not have periodicity in the wave guide direction, and does not have a definite photonic bandgap, but it has a band related to the photonic bandgap and a defect structure in the photonic bandgap; therefore, such a photonic crystal can be treated as a photonic crystal having photonic bandgaps each corresponding to each of the positions along the wave guide direction.

In FIG. 10, there is shown a band 20 corresponding to a defect wave guide at a specific position in the photonic crystal having a distributed refraction index, and a region 21 indicating the frequency of the light being guided in the defect wave guide. The frequency region 21 is relatively shown with respect to the band 20, and corresponds to a wavelength region of the light being guided in the defect wave guide.

In FIG. 10, with respect to the frequency region 21, in the photonic crystal structure shown in FIG. 9, there is a band edge in the photonic bandgap.

FIGS. 11A through 11D schematically illustrate light propagation states of the refraction index distributed photonic crystal of the present embodiment as shown in FIG. 9 and FIG. 10, by showing the variation of the band diagram in the wave guide direction in the photonic crystal corresponding to the positions A, B, C, and D in FIG. 9, respectively.

In FIGS. 11A through 11D, the reference numbers 18a, 18b, and 18c represent three frequencies corresponding to an upper limit, a middle value, and a lower limit, respectively, selected from the frequency region of the light being guided in the defect wave guide. The reference numbers 19a, 19b, 19c, and 19d indicate a band related to a propagation direction in the photonic crystal, which shifts along with a continuous decrease of the difference of the refraction index. The reference numbers 20a, 20b, and 20c indicate a turning effect of the light at the band edge.

In FIGS. 11A through 11D, in descending order of the frequency of the light, and at the positions B, C, and D, sequentially, the light being guided in the defect wave guide coincides with the band edge in the defect wave guide, sequentially. The positions B, C, and D in FIG. 11 correspond to the positions B, C, and D in FIG. 9, respectively. As a result, the group speed becomes substantially zero when the light coincides with the band edge, and it is possible to realize a delay of the light by a few ps (substantially a stagnation of the light). After that, the light is reflected to the original wave guide direction, and becomes the guided light 16, which propagates in a direction opposite to the incident direction. The optical control element formed from the photonic crystal is capable of changing the dispersion and the group speed greatly while utilizing the optical stagnation state.

Figure 12:
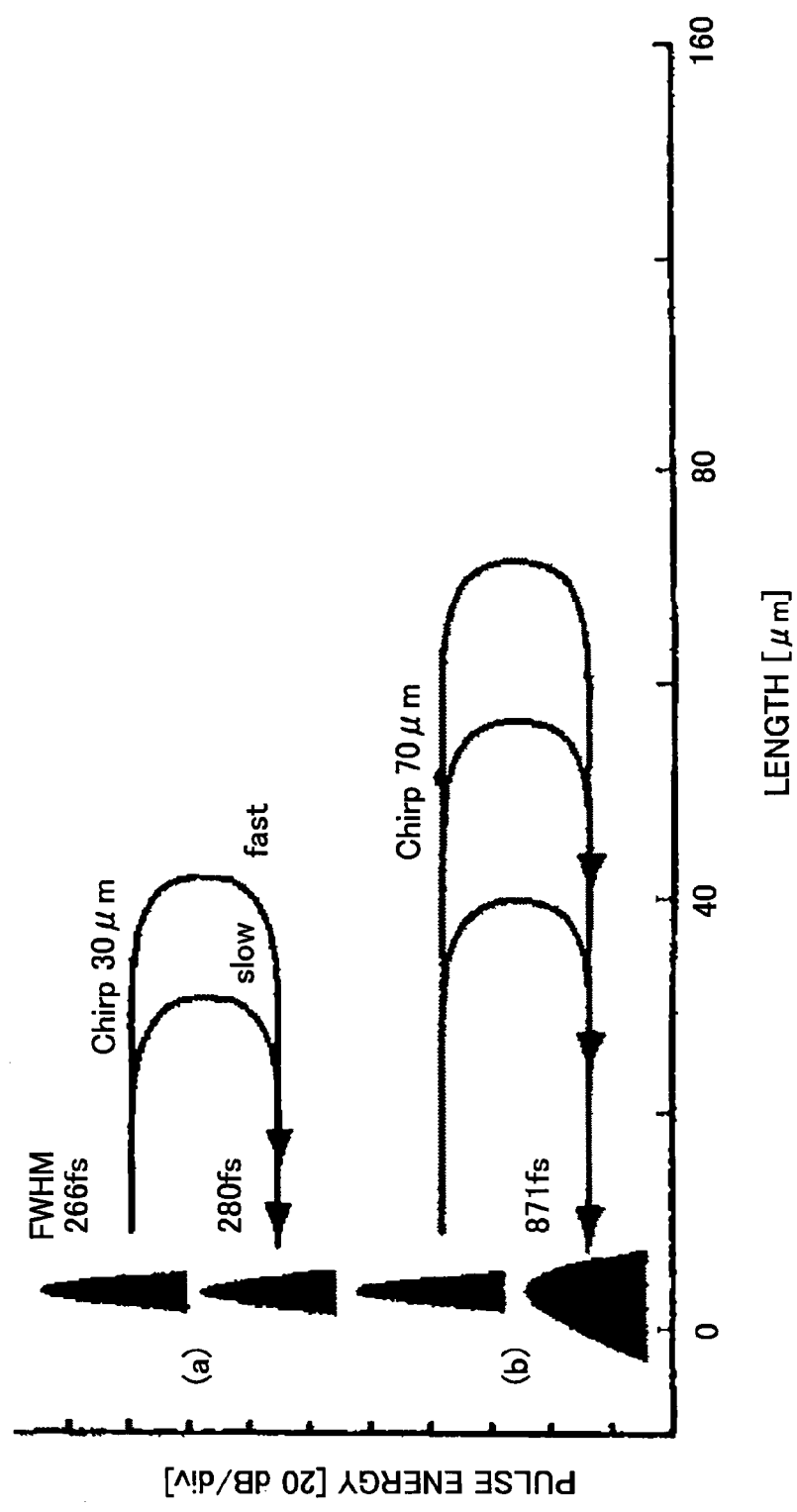
FIG. 12 illustrates the dispersion control effect and the group speed delay effect according to the present embodiment.

FIG. 12 illustrates the dispersion control effect and the group speed delay effect according to the present embodiment.

In the portion (a) of FIG. 12, in the thin film 1, which acts as an optical control element formed from the photonic crystal having a distributed refraction index shown in FIG. 9, the refraction index of the thin film 1 at the incident position is 2.963, and this refraction index linearly decreases continuously, and becomes 2.800 near the band edge. In this case, the length of the defect wave guide involving the distributed refraction index is 30 µm, the period a of each hole is 0.39 µm, and the diameter 2r of each hole is 0.39 µm. The portion (a) of FIG. 12 shows an example of the propagation state of the light at a frequency having a band edge in the defect wave guide, with the light entering the optical control element of the above structure in a pulsed manner with a pulse width of 300 fs.

In FIG. 12, the abscissa represents a relative coordinate relative to an incident position of the short pulse in the photonic crystal, and the ordinate represents electric field strength. The wavelength of the light entering the wave guide is 1.55 µm, and the FWHM (Full Width at Half Maximum) of the short light pulse is 266 fs, shown as the width in the horizontal direction, which corresponds to the propagating group speed, and from this pulse width, the magnitude of the dispersion can be obtained. The light propagation state of the optical control element according to the present embodiment is obtained by numerical calculation through FDTD simulations.

As illustrated in the portion (a) of FIG. 12, the short-pulsed light has a spread wavelength region, and usually it is apt to be influenced by the wavelength dispersion, namely, frequency dispersion. Nevertheless, in the optical control element according to the present embodiment, the pulse width of the reflected light is 280 fs, while the pulse width on the incident side is 266 fs. That is, the short light pulse almost does not spread in the time domain. This is a strong dispersion control effect achieving a very small dispersion, which could not be realized by the photonic crystal having a large frequency dispersion. Despite the very small dispersion, the propagation time of the light across a very small region of about 30 µm and back is 3.46 ps, corresponding to a group speed of the propagating light below 1/30 of that in a vacuum and in the air, and below 1/20 of that in a single mode optical fiber. Therefore, it is possible to provide a highly compact optical control element having a large dispersion control effect and a large group speed delay effect.

The portion (b) of FIG. 12 shows another example of the propagation state of the light, demonstrating the strong effects of dispersion control and group speed delay according to the present embodiment.

In the portion (b) of FIG. 12, in the thin film 1, which acts as an optical control element formed from the photonic crystal having a distributed refraction index shown in FIG. 9, the refraction index of the thin film 1 at the incident position is 2.963, and this refraction index linearly decreases continuously, and becomes 2.800 near the band edge. In this case, the length of the defect wave guide involving the distributed refraction index is 70 µm, the period a of each hole is 0.39 µm, and the diameter 2r of each hole is 0.39 µm. The portion (b) of FIG. 12 shows another example of the propagation state of the light at a frequency having a band edge in the defect wave guide, with the light entering the optical control element of the above structure in a pulsed manner with a pulse width of 300 fs. The wavelength of the light entering the wave guide is 1.55 µm, and the FWHM (Full Width at Half Maximum) of the light pulse is 266 fs. The light propagation state of the optical control element according to the present embodiment is obtained by numerical calculation by FDTD simulations.

As illustrated in the portion (b) of FIG. 12, the short-pulsed light has a spread wavelength region, and by using the optical control element according to the present embodiment, the pulse width of the reflected light is 871 fs, while the pulse width on the incident side is 266 fs. That is, the short light pulse spreads by about 600 fs in the time domain.

That is, the optical control element of the present embodiment has a dispersion property, namely, with the waveform being well maintained, the short-pulsed light spreads highly precisely in a time scale at the fs level, which is shorter than 1 ps. Moreover, the distribution of the refraction index of the photonic crystal is the same as that in the portion (a) of FIG. 12, and the propagation distance is increased from 30 µm in the portion (a) of FIG. 12 to 70 µm, and thereby, dispersion control is performed within a distance as short as 40 µm. In addition, The propagation time of the light across a distance of 70 µm and back is 7.06 ps, and a low group speed is maintained. Therefore, it is possible to provide a highly compact optical control element having a large dispersion control effect and a large group speed delay effect.

Fifth Embodiment

Below, the fifth embodiment of the present invention is explained with reference to FIG. 13. In the present embodiment, the same reference numbers are used for the same elements as those in the previous embodiments.

Figure 13:
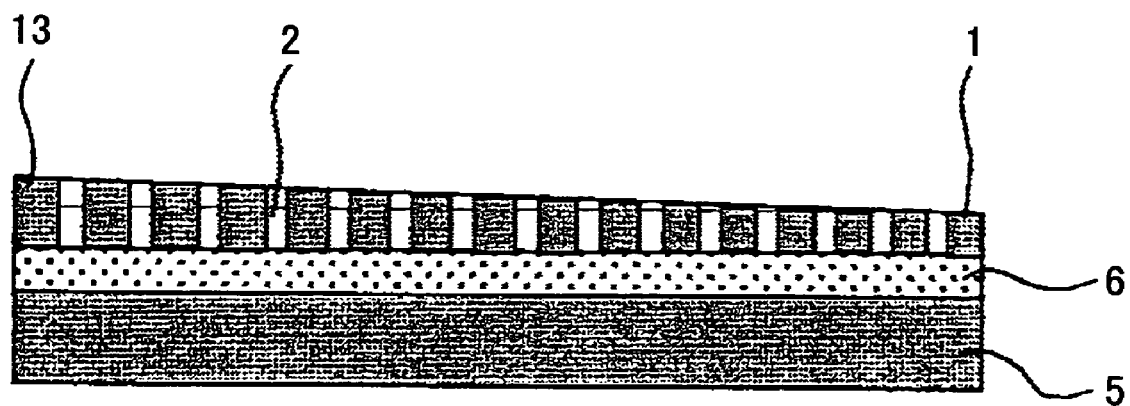
FIG. 13 is a cross-sectional view of an optical control element formed from a slab type two-dimensional photonic crystal according to a fifth embodiment of the present invention.

FIG. 13 is a cross-sectional view of an optical control element formed from a slab type two-dimensional photonic crystal according to the fifth embodiment of the present invention.

The optical control element shown in FIG. 13 includes a thin film 13 having a distributed effective refraction index, photonic crystal holes 2, a substrate 5, and an under clad layer 6. In FIG. 13, the holes 2 are formed in cylindrical shape perpendicular to the surface direction of the thin film 13, and the upper portion of each hole 2 is open.

The under clad layer 6 is formed from a material having a refraction index lower than that of the thin film 13, and acts as a component of a wave guide layer with the thin film 13 as a core layer. The substrate 5 is provided below the under clad layer 6.

In the structure of the photonic crystal shown in FIG. 13, the thin film 13 is formed from a uniform material, but the thickness thereof is large at the left side and is small at the right side in FIG. 13. Due to the gradually and continuously varying thickness of the thin film 13, the effective refraction index of the thin film 13 also varies gradually and continuously. Thus, a varying band appears in the wave guide direction in the defect wave guide, as shown in FIGS. 11A through 11D. Due to this, although the constituent material has a unique refraction index, the effective refraction index is variable, hence it becomes very easy to fabricate an optical control element from a photonic crystal having a distributed effective refraction index.

In FIG. 13, the thickness of the thin film is controlled by a CMP technique, which performs control of parallelism relative to the substrate 5. The roughness of the surface of the thin film is within 0.2 nm. Because complicated fine processing is not used in the above procedure, from this point of view, it is very easy to fabricate the optical control element from a photonic crystal having a distributed effective refraction index.

In the above, it is described that the effective refraction index of the thin film depends only on its thickness, but the present embodiment is not limited to this. For example, it is also possible to reduce the effective refraction index of the thin film by forming very small air holes or air slits, for example, less than ⅛ of the wavelength of the incident light. In addition, use can be made of a thin film having a uniform thickness, and this also makes fabrication of the optical control element very easy from a photonic crystal having a distributed effective refraction index.

In addition, the structural parameter of the present embodiment is not limited to the shape of the thin film 1, for example, the same effect can be achieved by changing the shape of the under clad layer, or by providing an over clad layer to change the shape.

Sixth Embodiment

Below, the sixth embodiment of the present invention is explained with reference to FIG. 14. In the present embodiment, the same reference numbers are used for the same elements as those in the previous embodiments.

Figure 14:
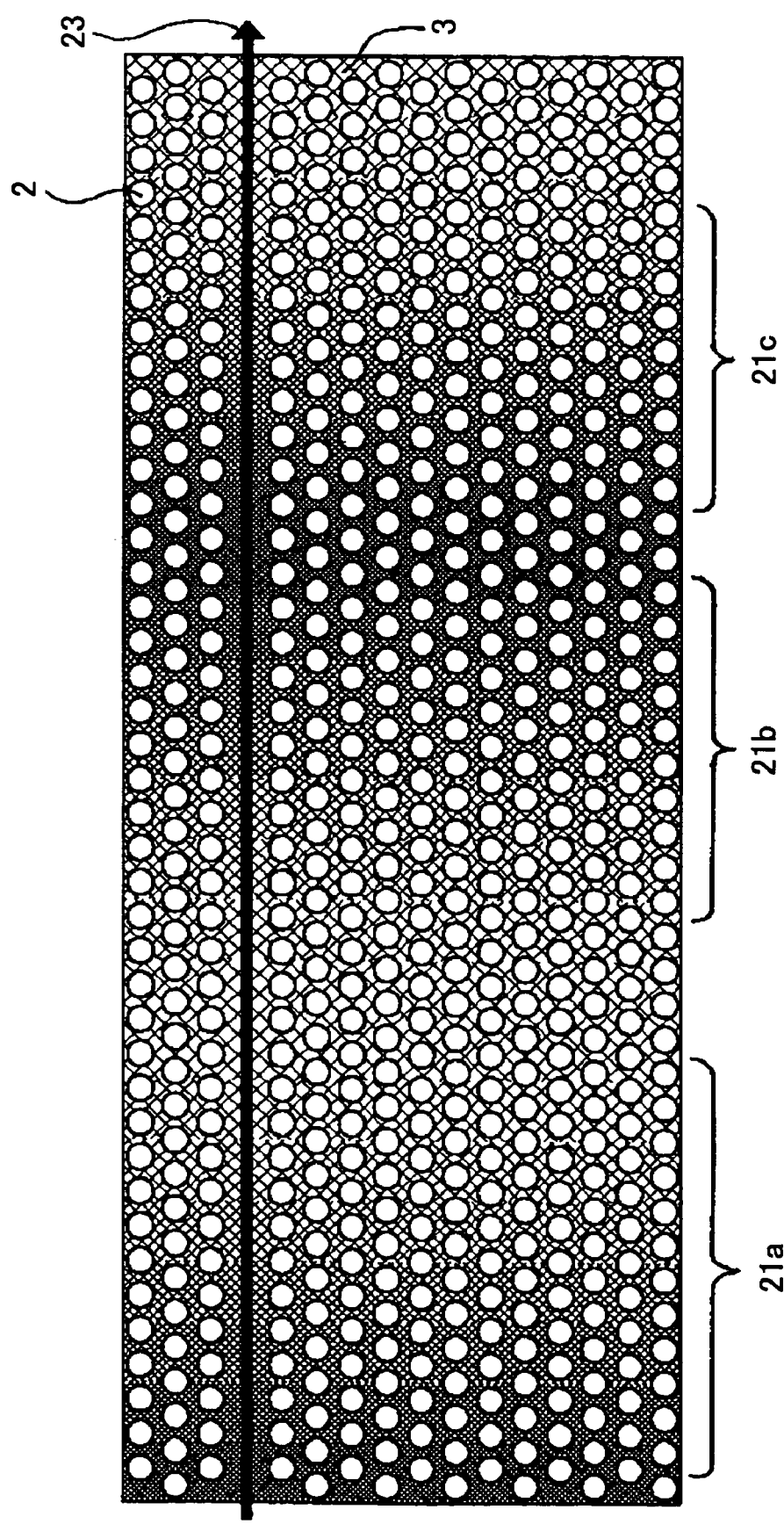
FIG. 14 is a schematic view of an optical control element formed from a refraction-index-distributed photonic crystal according to a sixth embodiment of the present invention.

FIG. 14 is a schematic view of an optical control element formed from a refraction-index-distributed photonic crystal according to the sixth embodiment of the present invention.

In FIG. 14, the refraction-index-distributed photonic crystal, whose refraction index varies continuously, is divided into three regions depending on the first derivative of the varying refraction index thereof. These three regions are indicated by the reference numbers 21a, 21b, 21c in FIG. 14, and with portions where the first derivative equals zero act as border lines, the regions 21a and 21c have increasing refraction indexes, and the regions 21b has a decreasing refraction index.

In the optical control element formed from a photonic crystal shown in FIG. 14, for each wave number, there can be many group speed states and dispersion states, and it is possible to realize an optical control element having a large dispersion control effect and a large group speed delay effect in a wide frequency band. In addition, because there are many regions having a zero group speed repeatedly arranged, it is possible to realize a highly compact optical control element having a low reflectivity and a long delay.

Seventh Embodiment

Below, the seventh embodiment of the present invention is explained with reference to FIG. 15 and FIG. 16. In the present embodiment, the same reference numbers are used for the same elements as those in the previous embodiments.

Figure 15:
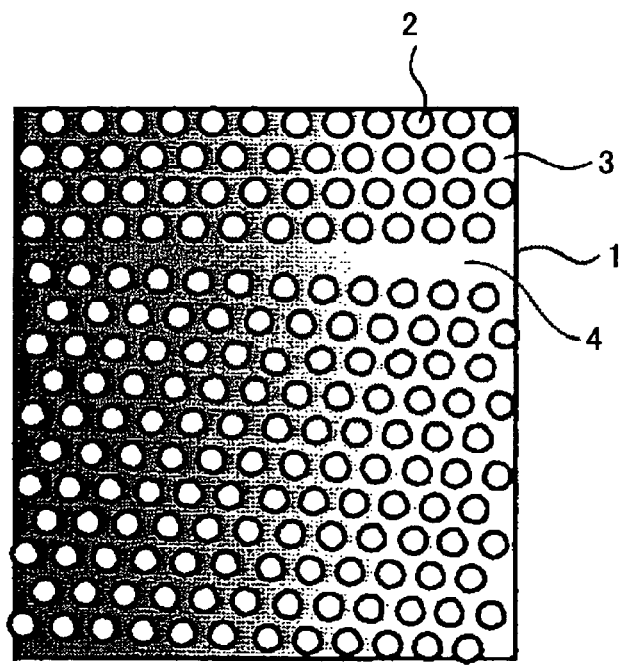
FIG. 15 is a schematic view of an example of an optical control element formed from a slab type two-dimensional photonic crystal according to a seventh embodiment of the present invention.

FIG. 15 is a schematic view of an example of an optical control element formed from a slab type two-dimensional photonic crystal according to the seventh embodiment of the present invention.

The optical control element shown in FIG. 15 includes a thin film 1 having a distributed refraction index, photonic crystal holes 2, and a defect wave guide 3. As shown in FIG. 15, light 4 is being guided by the defect wave guide 3. In FIG. 15, the photonic crystal includes the thin film 1 formed from a material having a high refraction index and holes 2 formed from a material having a low refraction index. Furthermore, in FIG. 15, the left portion of the thin film 1 has a relatively high refraction index, and the right portion of the thin film 10 has a relatively low refraction index.

The relative position coordinates of the holes 2 in FIG. 15 form triangular arrangements which have the same periodicity as the photonic crystal of the related art. This structure is the same as that in FIG. 1, but in FIG. 15, these arrangements sandwich the defect wave guide and are inclined, thus, the arrangement of the holes distorts with the defect wave guide as border lines. Due to this, the width of the defect wave guide varies continuously along the eave guide direction, and this variation is combined with the variation of a continuous variation of the refraction index; thereby, it is possible to largely control bands in the defect wave guide, and performs dispersion control and group speed control with high precision.

Figure 16:
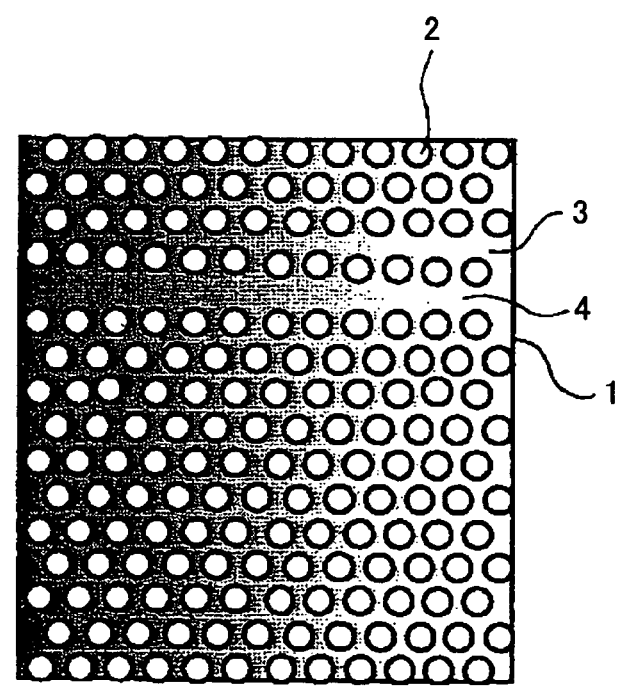
FIG. 16 is a schematic view of another example of the optical control element formed from a slab type two-dimensional photonic crystal according to the present embodiment.

FIG. 16 is a schematic view of another example of the optical control element formed from a slab type two-dimensional photonic crystal according to the present embodiment.

In the optical control element shown FIG. 16, the distortion of the arrangement of the holes varies stepwise in wave guide direction. As shown in the right-upper portion of FIG. 16, sequences of the holes 2 near the defect wave guide 3 are shifted by one hole.

Due to this, the width of the defect wave guide varies continuously along the wave guide direction, and this variation is combined with the variation of a continuous variation of the refraction index, thereby, it is possible to largely control bands in the defect wave guide, and performs dispersion control and group speed control with high precision.

Eighth Embodiment

Below, the eighth embodiment of the present invention is explained with reference to FIG. 17. In the present embodiment, the same reference numbers are used for the same elements as those in the previous embodiments.

Figure 17:
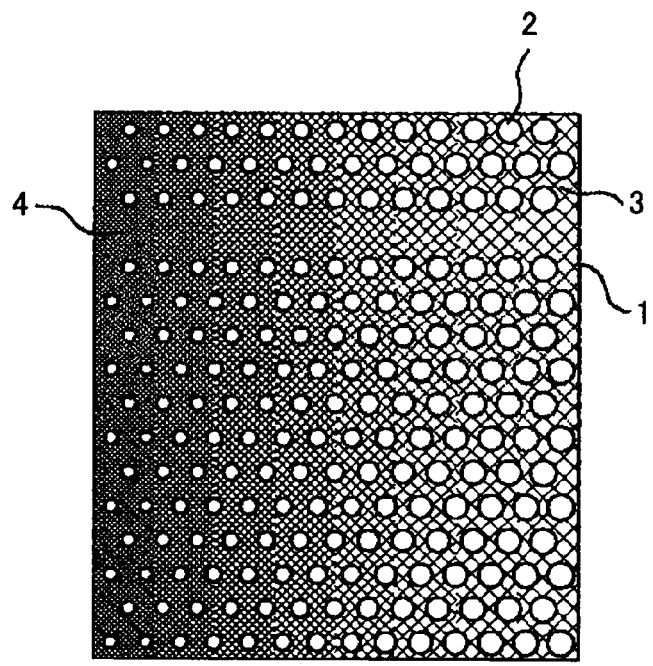
FIG. 17 is a schematic view of an example of an optical control element formed from a slab type two-dimensional photonic crystal according to an eighth embodiment of the present invention.

FIG. 17 is a schematic view of an example of an optical control element formed from a slab type two-dimensional photonic crystal according to the eighth embodiment of the present invention.

The optical control element shown in FIG. 17 includes a thin film 1 having a distributed refraction index, photonic crystal holes 2, and a defect wave guide 3. As shown in FIG. 17, light 4 is being guided by the defect wave guide 3. In FIG. 17, the photonic crystal includes the thin film 1 formed from a material having a high refraction index and holes 2 formed from a material having a low refraction index. Furthermore, in FIG. 17, the left portion of the thin film 1 has a relatively high refraction index, and the right portion of the thin film 1 has a relatively low refraction index.

In FIG. 17, the diameter of the hole 2 increases gradually in the wave guide direction, and due to this, the band in the defect wave guide varies continuously along the wave guide direction. This variation is combined with the variation of a continuous variation of the refraction index of the thin film 1; thereby, it is possible to largely control bands in the defect wave guide, and perform dispersion control and group speed control with high precision.

In FIG. 17, the relative position coordinates of the holes 2 in FIG. 17 form triangular arrangements which have the same periodicity as the photonic crystal in FIG. 1. When a resist is used, the same mask can be used to change only the dose of exposure of ultraviolet rays, and hence, the structure in FIG. 17 can be fabricated easily, for example, by photo-lithography, or by electron beam irradiation with the same position coordinates and a converted dose.

Ninth Embodiment

Below, the ninth embodiment of the present invention is explained with reference to FIG. 18. In the present embodiment, the same reference numbers are used for the same elements as those in the previous embodiments.

Figure 18:
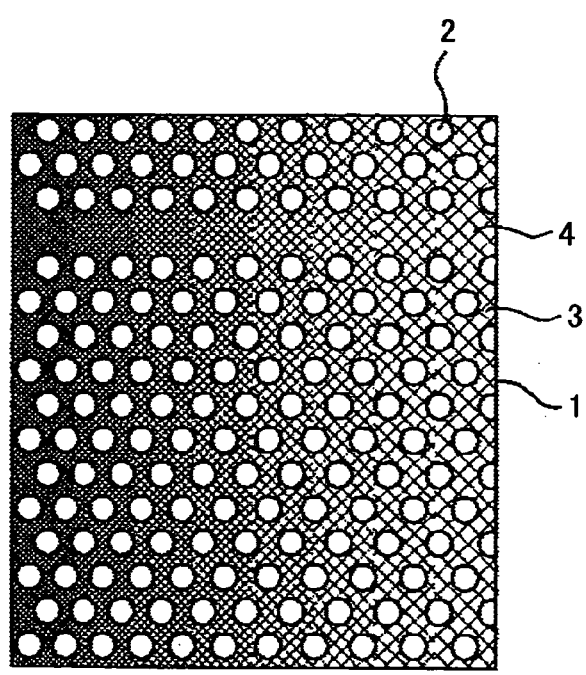
FIG. 18 is a schematic view of an example of an optical control element formed from a slab type two-dimensional photonic crystal according to a ninth embodiment of the present invention.

FIG. 18 is a schematic view of an example of an optical control element formed from a slab type two-dimensional photonic crystal according to the ninth embodiment of the present invention.

The optical control element shown in FIG. 18 includes a thin film 1 having a distributed refraction index, photonic crystal holes 2, and a defect wave guide 3. As shown in FIG. 18, light 4 is being guided by the defect wave guide 3. In FIG. 18, the photonic crystal includes the thin film 1 formed from a material having a high refraction index and holes 2 formed from a material having a low refraction index. Furthermore, in FIG. 18, the left portion of the thin film 1 has a relatively high refraction index, and the right portion of the thin film 1 has a relatively low refraction index.

In FIG. 18, the distance between two adjacent holes 2 increases gradually in the wave guide direction. Hence, the band in the defect wave guide varies continuously along the wave guide direction, and this variation is combined with the variation of a continuous variation of the refraction index of the thin film 1. Thereby, it is possible to largely control bands in the defect wave guide, and performs dispersion control and group speed control with high precision.

In FIG. 18, the diameter of the holes 2 is the same, and only the relative position coordinate of the holes 2 changes gradually, hence, it is not necessary to change the dose of ultraviolet rays or the dose of an electron beam, and the exposure conditions can be set unchanged. In this state, the relative exposure position only in the wave guide direction can be accurately controlled. By using such an alignment device for controlling the relative exposure position, the structure in FIG. 18 can be fabricated easily.

10th Embodiment

Below, the 10th embodiment of the present invention is explained with reference to FIG. 19 and FIG. 20. In the present embodiment, the same reference numbers are used for the same elements as those in the previous embodiments.

Figure 19:
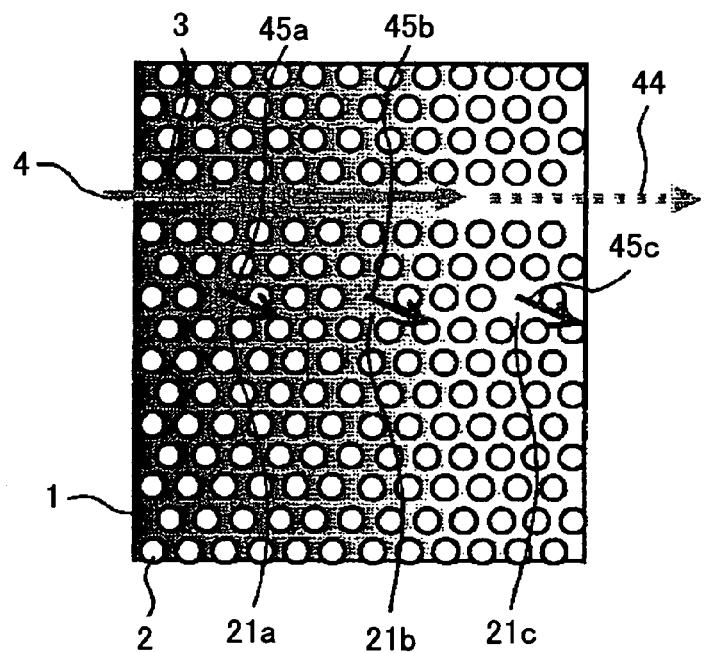
FIG. 19 is a schematic view of an example of an optical control element formed from a slab type two-dimensional photonic crystal according to a 10th embodiment of the present invention.

FIG. 19 is a schematic view of an example of an optical control element formed from a slab type two-dimensional photonic crystal according to the 10th embodiment of the present invention.

The optical control element shown in FIG. 19 includes a thin film 1 having a distributed refraction index, photonic crystal holes 2, and a defect wave guide 3. As shown in FIG. 19, light 4 is being guided by the defect wave guide 3. In FIG. 19, the photonic crystal includes the thin film 1 formed from a material having a high refraction index and holes 2 formed from a material having a low refraction index. Furthermore, in FIG. 19, the left portion of the thin film 1 has a relatively high refraction index, and the right portion of the thin film 1 has a relatively low refraction index.

Further, the photonic crystal includes dot-defect wave guides 21a, 21b, and 21c. The reference number 45 indicates the divergent light emitted from the dot defect. The reference number 44 indicates the light being guided by the defect wave guide 3 after a portion of the incident light 4 is branched from the defect wave guide 3 to the dot defect wave guide.

In FIG. 19, of the light being guided by the defect wave guide 3, a portion thereof having a specific frequency is coupled to one of the dot defects, and this portion diverges in a direction perpendicular to the slab type two-dimensional photonic crystal. This just looks like that there exists an optical connection between the defect wave guide 3 and the dot defects for the propagating the light, and from this point of view, the dot defects to which light is coupled is one of a connection defect structure, which is a defect structure for optical connection. Further, in FIG. 19, since the refraction index of the thin film 1 varies continuously in the wave guide direction, while the band in the defect wave guide varies continuously, the band corresponding to the dot defects also varies according to the positions of the dot defects. By appropriately considering these factors, it is possible to obtain a connection defect structure having different coupling efficiencies depending on the frequency of the light, and realize an optical control device capable of light combination and light separation, or an optical control device capable of extracting light of a wide frequency band.

Below, the divergence of light from the dot defects is explained, from the point of view of overlapping of bands of the defect wave guide 3 and the dot defects. For a specific frequency, if the two bands are overlapped, and these two kinds of defects come so close to each other that influence of the photonic bandgap is small and interactions occur between them, the light portions at this frequency resonate with each other and are connected with each other. Due to such dot defects, the photonic crystal according to the present embodiment can be used in an optical control element for measuring the wavelength and strength of the light being guided, specifically, after dispersion control or group speed control in the slab type two-dimensional photonic crystal, the light can be extracted and measured by an optical detector.

Figure 20:
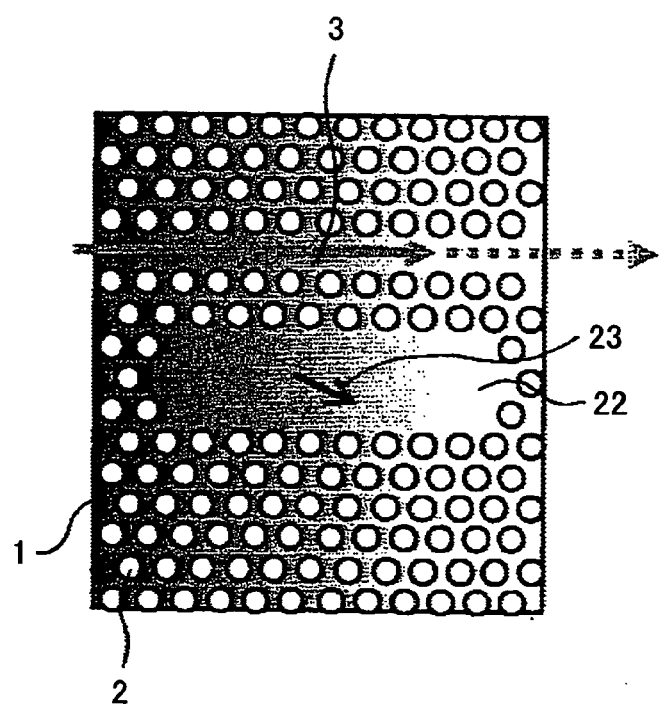
FIG. 20 is a schematic view of another example of the optical control element formed from a slab type two-dimensional photonic crystal according to the 10th embodiment of the present invention.

FIG. 20 is a schematic view of another example of the optical control element formed from a slab type two-dimensional photonic crystal according to the 10th embodiment of the present invention.

In FIG. 20, instead of the dot defects, there is a large defect structure 22 where holes do not exist, and divergent light 23 is emitted from the defect structure 22. In this case, the binding effect of the photonic bandgap is weak, and light of a wide frequency band can be emitted from the slab type two-dimensional photonic crystal. The defect structure 22 is not limited to dot defects, and other kinds of defect structures can also be used as long as such a defect structure has a band different from the band of the original defect wave guide, and optical coupling is enabled between the bands, when holes do not exist, or when deformation of the holes is large.

11th Embodiment

Below, the 11th embodiment of the present invention is explained with reference to FIG. 21 and FIG. 22. In the present embodiment, the same reference numbers are used for the same elements as those in the previous embodiments.

Figure 21:
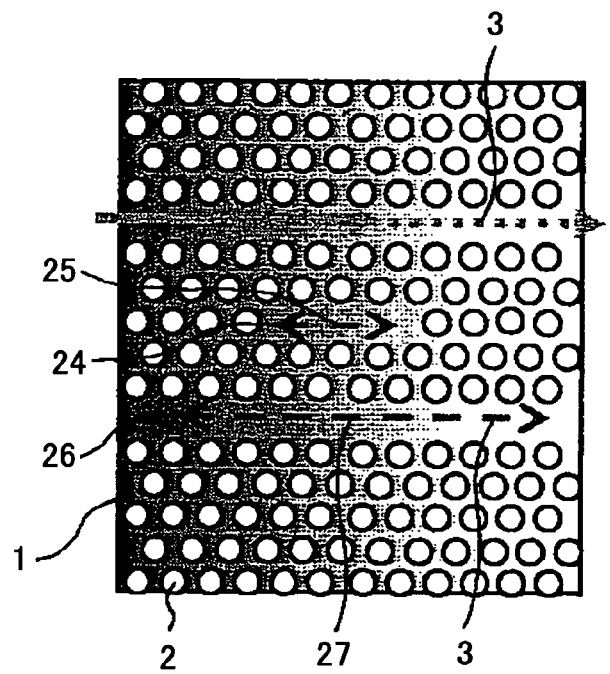
FIG. 21 is a schematic view of an example of the optical control element formed from a slab type two-dimensional photonic crystal according to an 11th embodiment of the present invention.

FIG. 21 is a schematic view of an example of the optical control element formed from a slab type two-dimensional photonic crystal according to the 11th embodiment of the present invention.

In FIG. 21, instead of a single dot defect in FIG. 19, there are a defect structure 24 including three consecutive dot defects, and a connection defect wave guide 26 as a defect structure different from the defect wave guide 3. The reference number 25 indicates light resonating in the defect structure 24, the reference number 27 indicates the light being guided in the connection defect wave guide 26, which is a defect structure. Once the light 4 being guided in the defect wave guide 3, which has a distributed refraction index, is coupled to the defect structure 24, the light 4 becomes the light 25. In addition, when this coupled light 25 is further coupled to the connection defect wave guide 26, which is another defect structure, the light 25 becomes the light 27. In this way, optical connection is realized.

In the structure shown in FIG. 21, the defect structure 24 is an intermediate connection defect structure, which is located at an intermediate position for connection. By providing such an intermediate connection defect structure, it is possible to select and connect light in accordance with the frequency, or group speed delay, or dispersion of light related to the band properties of the intermediate connection defect structure. Through connection of the light to the intermediate connection position, the selectively connected light is coupled to the connection defect wave guide 26, which has a photonic crystal structure different from that of the refraction-index distributed defect wave guide 3. The light 25 at the intermediate connection position is further guided in the photonic crystal. In this way, while controlling the light by utilizing the large dispersion control effect and a large group speed delay effect, frequency selective control can be performed, and the light 25 can be re-used in the photonic crystal; therefore, it is possible to provide a compact optical control element having composite functions. In a practical intermediate connection defect structure, where resonance occurs between the refraction-index distributed defect wave guide 3 and the connection defect wave guide 26, which has a photonic crystal structure different from that of the defect wave guide 3, it is preferable that design of the structure including the two defect wave guides be optimized.

Figure 22:
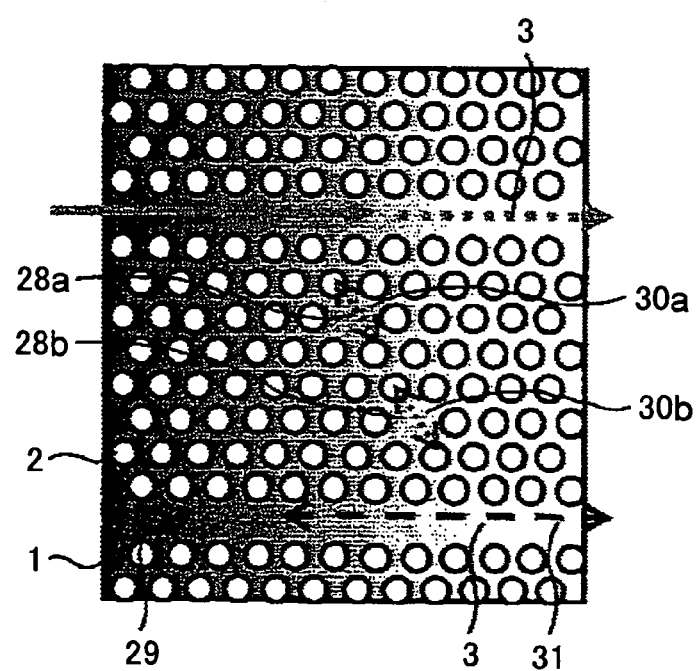
FIG. 22 is a schematic view of another example of the optical control element formed from a slab type two-dimensional photonic crystal according to the 11th embodiment of the present invention.

FIG. 22 is a schematic view of another example of the optical control element formed from a slab type two-dimensional photonic crystal according to the 11th embodiment of the present invention.

In FIG. 22, instead of the defect structure 24 including three consecutive dot defects in FIG. 21, there are two isolated dot defects 28a and 28b. The two isolated dot defects 28a and 28b are coupled to each other, and light 30 resonating at the dot defects 28a and 28b is coupled to the refraction-index distributed defect wave guide 3 and another defect wave guide 29, which has a photonic crystal structure different from that of the defect wave guide 3. Then the light 30 becomes light 31 and propagates in the photonic crystal.

In the structure shown in FIG. 22, when there are plural intermediate defect structures, there may be two or more intermediate connection defect structures, and the intermediate connection defect structures may operate independently or corporately as shown in FIG. 22. The defect structure is not limited to the dot defect structure. For example, a defect structure from the usual line defect is also very effective for broadening the wavelength region.

12th Embodiment

Below, the 12th embodiment of the present invention is explained with reference to FIG. 23 and FIG. 24. In the present embodiment, the same reference numbers are used for the same elements as those in the previous embodiments.

Figure 23:
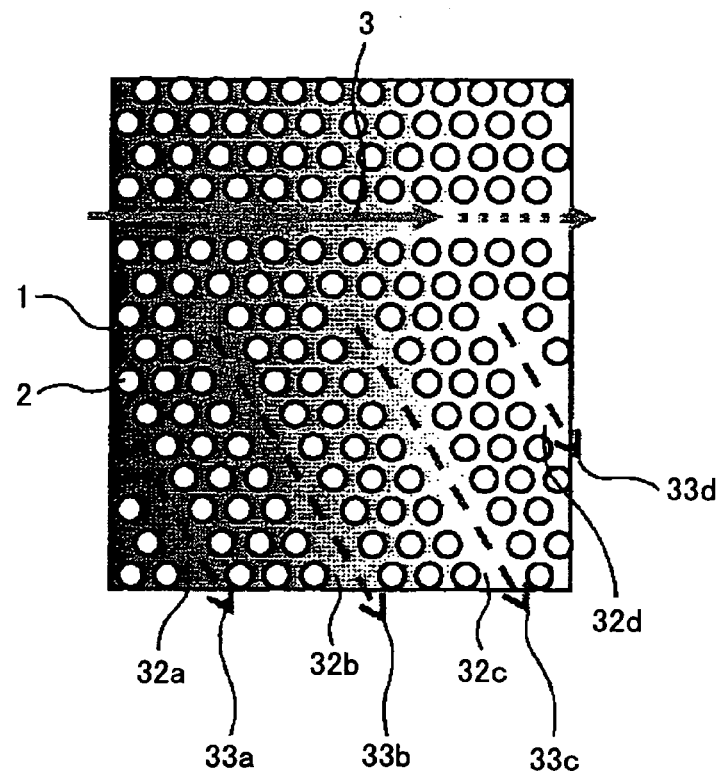
FIG. 23 is a schematic view of an example of the optical control element formed from a slab type two-dimensional photonic crystal according to a 12th embodiment of the present invention.

FIG. 23 is a schematic view of an example of the optical control element formed from a slab type two-dimensional photonic crystal according to the 12th embodiment of the present invention.

In FIG. 23, there are connection defect wave guides 32 each formed from a connection defect structure including line defects. Light 33 is coupled to each of the defect wave guides from the defect wave guide 3 which has a distributed refraction index, is sequentially connected to each of the connection defect wave guides 32, and is guided inside the photonic crystal.

Therefore, it is possible to provide a compact optical integration element which is coupled to other optical control elements, and enables re-propagation of the light in the photonic crystal while controlling the light by utilizing the large dispersion control effect and a large group speed delay effect. Furthermore, by using plural connection defect wave guides, it is possible to perform frequency selective control.

Figure 24:
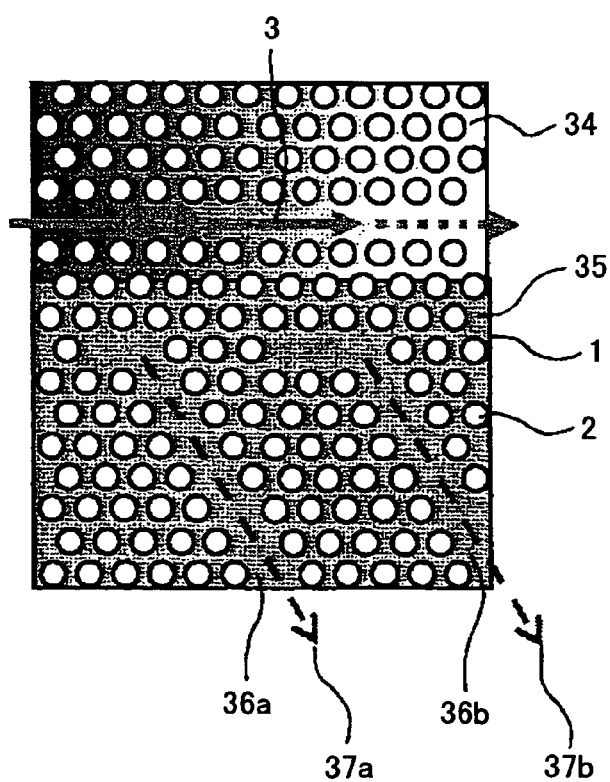
FIG. 24 is a schematic view of another example of the optical control element formed from a slab type two-dimensional photonic crystal according to the 12th embodiment of the present invention.

FIG. 24 is a schematic view of another example of the optical control element formed from a slab type two-dimensional photonic crystal according to the 12th embodiment of the present invention.

The optical control element shown in FIG. 24 includes a thin film 34 having a distributed refraction index, a thin film 35 without a distributed refraction index, photonic crystal holes 2, and a defect wave guide 3. As shown in FIG. 24, light 4 is being guided by the defect wave guide 3. In FIG. 24, the photonic crystal includes the thin film 34 and thin film 35 formed from a material having a high refraction index and holes 2 formed from a material having a low refraction index. Furthermore, in FIG. 24, the left portion of the thin film 34 has a relatively high refraction index, and the right portion of the thin film 34 has a relatively low refraction index.

In FIG. 24, there are connection defect wave guides 36 each formed from a connection defect structure including line defects. Lights 37a and 37b are coupled to the corresponding defect wave guides 36 from the original defect wave guide 3 which has a distributed refraction index, and are guided inside the photonic crystal. In the above case, as shown in FIG. 24, the connection defect wave guides 36 are formed from a usual defect wave guide that does not have a distributed refraction index. Even in this case, because the defect wave guide that has a distributed refraction index is configured to have peculiar properties related to its relative position with respect to the frequency of the light, it is possible to enable re-use of the light in the photonic crystal, and greatly reduce the size of an integrated element including plural optical control functions, after performing frequency selective control.

13th Embodiment

Below, the 13th embodiment of the present invention is explained with reference to FIG. 25. In the present embodiment, the same reference numbers are used for the same elements as those in the previous embodiments.

Figure 25:
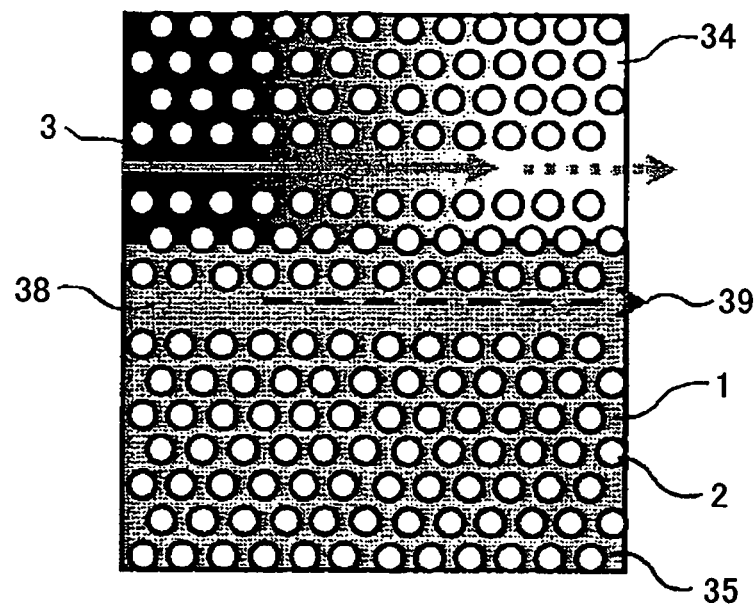
FIG. 25 is a schematic view of an example of the optical control element formed from a slab type two-dimensional photonic crystal according to a 13th embodiment of the present invention.

FIG. 25 is a schematic view of an example of the optical control element formed from a slab type two-dimensional photonic crystal according to the 13th embodiment of the present invention.

The optical control element shown in FIG. 25 includes a thin film 34 having a distributed refraction index, a thin film 35 without a distributed refraction index, photonic crystal holes 2, and a defect wave guide 3. As shown in FIG. 25, light 4 is being guided by the defect wave guide 3. In FIG. 25, the photonic crystal includes the thin film 34 and thin film 35 formed from a material having a high refraction index and holes 2 formed from a material having a low refraction index. Furthermore, in FIG. 25, the left portion of the thin film 34 has a relatively high refraction index, and the right portion of the thin film 34 has a relatively low refraction index.

In FIG. 25, there is a connection defect wave guide 38 formed from a connection defect structure including line defects, and the connection defect wave guide 38 has such a shape that it functions as a directional coupler to the original defect wave guide 3 which has a distributed refraction index. Due to this, the light 4 being guided in the refraction index distributed defect wave guide 3 is connected to the connection defect wave guide 38, acting as a directional coupler, with high coupling efficiency, and becomes light 39. Therefore, it is possible to provide a transmission type optical control element that has high light utilization efficiency and transmits light straight forward, and provide an optical control element having high reliability against noises because the electric field strength of the light 39 (that is, light amount of the light 39) is large.

Furthermore, as shown in FIG. 25, because the connection defect wave guides 38 is formed from a usual defect wave guide which does not have a distributed refraction index, the original defect wave guide 3 of a distributed refraction index has bands depending on the relative position with respect to the frequency of the light, and the other defect wave guide has a definite band, the directional coupler is able to control the coupling efficiency corresponding to a long wavelength in different directions, thus improving wavelength selectivity.

14th Embodiment

Below, the 14th embodiment of the present invention is explained with reference to FIG. 26 and FIG. 27. In the present embodiment, the same reference numbers are used for the same elements as those in the previous embodiments.

Figure 26:
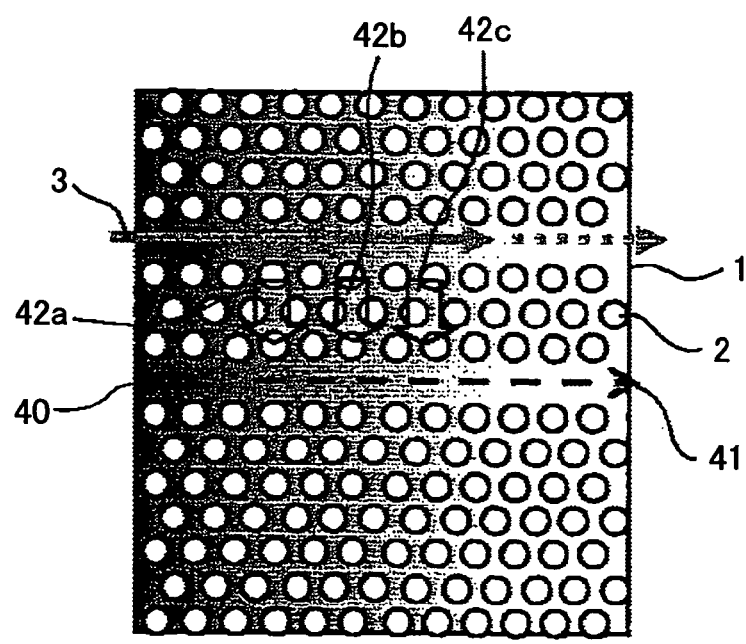
FIG. 26 is a schematic view of an example of the optical control element formed from a slab type two-dimensional photonic crystal according to a 14th embodiment of the present invention.

FIG. 26 is a schematic view of an example of the optical control element formed from a slab type two-dimensional photonic crystal according to the 14th embodiment of the present invention.

The optical control element shown in FIG. 26 includes a thin film 1 having a distributed refraction index, photonic crystal holes 2, and a defect wave guide 3. As shown in FIG. 26, light 4 is being guided by the defect wave guide 3. In FIG. 26, the photonic crystal includes the thin film 1 formed from a material having a high refraction index and holes 2 formed from a material having a low refraction index. Furthermore, in FIG. 26, the left portion of the thin film 1 has a relatively high refraction index, and the right portion of the thin film 1 has a relatively low refraction index.

In FIG. 26, there is a refraction index distributed connection defect wave guide 40 formed from a connection defect structure including line defects in a refraction index distributed photonic crystal, and the connection defect wave guide 40 has such a shape that it functions as a directional coupler to the original defect wave guide 3 which has a distributed refraction index. Due to this, the light 4 being guided in the refraction index distributed defect wave guide 3 is coupled to the connection defect wave guide 40, acting as a directional coupler with high coupling efficiency, and becomes light 41. Therefore, it is possible to provide a transmission type optical control element that has high light utilization efficiency and transmits light straight forward.

Furthermore, as shown in FIG. 26, because both of the two connection defect wave guides have a distributed refraction index, both of the two defect wave guides are capable of optimum control of the bands depending on the relative position with respect to the frequency of the light, thereby, reducing the wavelength dependence of the directional coupler, and realizing a directional coupler having a wide frequency band.

In FIG. 26, downward arrows indicated by the reference numbers 42a, 42b, and 42c schematically show a mode of coupling when forming a directional coupler using refraction index distributed connection defect wave guides having essentially the same refraction index distribution. By changing the location of coupling depending on the wavelength, it is possible to realize high efficiency optical coupling in a wide wavelength region. In order to further spread the wide frequency region, it is preferable to optimize corrections to a coupling distance related to the wavelength.

Figure 27:
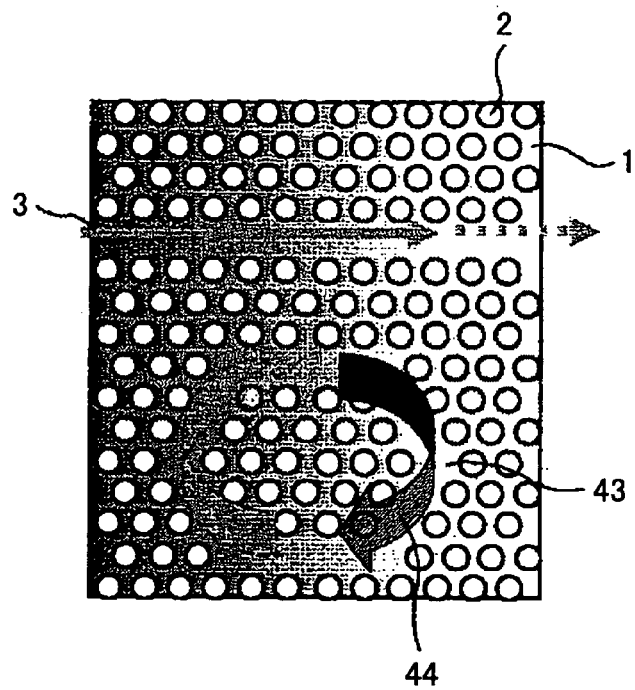
FIG. 27 is a schematic view of another example of the optical control element formed from a slab type two-dimensional photonic crystal according to the 14th embodiment of the present invention.

FIG. 27 is a schematic view of another example of the optical control element formed from a slab type two-dimensional photonic crystal according to the 14th embodiment of the present invention.

In FIG. 27, the connection defect wave guide is a ring-shaped connection defect wave guide 43. In such a structure, the frequency property of the defect wave guide having a distributed refraction index varies in the wave guide direction, in addition, the ring wave guide 43 is a resonator; thereby, the coupled light 44 being guided in this structure can be coupled by wavelength-selective directional coupling at high precision, and the optical coupling efficiency can be improved while light propagates in the ring resonator.

15th Embodiment

Below, the 15th embodiment of the present invention is explained with reference to FIG. 28 through FIG. 30. In the present embodiment, the same reference numbers are used for the same elements as those in the previous embodiments.

Figure 28:
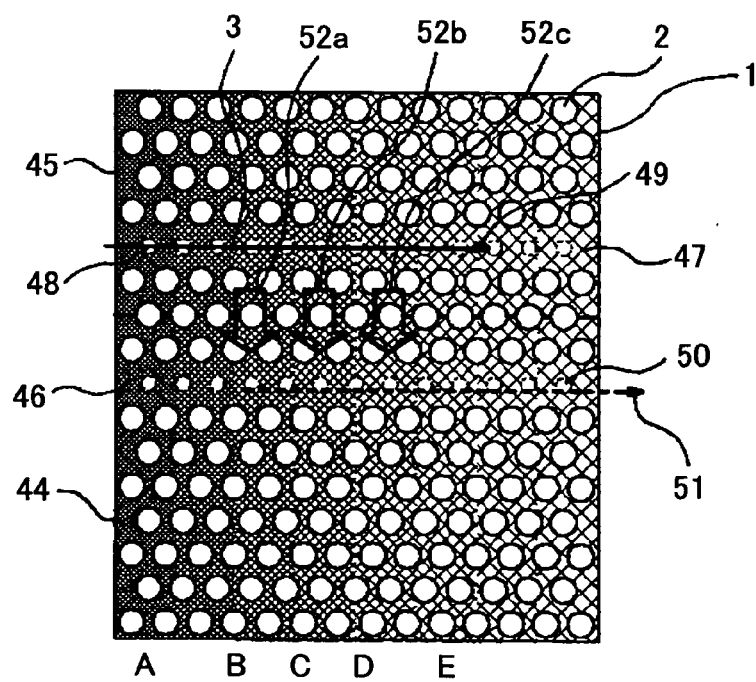
FIG. 28 is a schematic view of an example of the optical control element formed from a slab type two-dimensional photonic crystal according to a 15th embodiment of the present invention.

FIG. 28 is a schematic view of an example of the optical control element formed from a slab type two-dimensional photonic crystal according to the 15th embodiment of the present invention.

The optical control element shown in FIG. 28 includes thin films 44 and 45 each having a distributed refraction index, photonic crystal holes 2, and defect wave guides 3, 46 and 47. Lights 49 and 51 are being guided by the defect wave guides 3, 46 and 47.

Each of the defect wave guides 46 and 47 includes small holes 48 and 50 at the center portion thereof, and each of the small holes 48, 50 is much smaller than the holes 2 that constitute the refraction index-distributed photonic crystal.

The refraction index distribution of the thin film 44 is different from that of the thin film 45, but the left portion of either of the thin films 44, 45 has a relatively high refraction index, and the right portion of either of the thin films 44, 45 has a relatively low refraction index. Further, the thin film 44 has a relatively lower refraction index than and the thin film 45.

The arrows 52a, 52b, and 52c show coupling positions of a directional coupler at three different frequencies.

The optical control element in FIG. 28 has a large dispersion control effect and a large group speed delay effect. In the meantime, it is also a convenient transmission type optical control element, namely, it does not need an optical separation element for bi-directional light propagation. Below, the principle of the optical control element is described.

In FIG. 28, a directional coupler is formed from two refraction index distributed defect wave guides. In this structure, small holes 48 and 50 are formed at the center portions of the defect wave guides 46 and 47, respectively, and these holes produce two different type bands, that is, band of negative dispersion and band of positive dispersion. Where necessary, the two types of bands are referred to as "band having a positive slope" and "band having a negative slope". Because the band edges of the two types of bands are separated from each other, refraction index distributions are imposed on the above structure so that the band edges of the two types of bands are in agreement. This can be realized by adjusting the refraction index distributions of the films 44 and 45. Specifically, the refraction index of the films 44 may be reduced so that the position of the band having a positive slope, which is originally at a relatively low position, shifts upward, and the refraction index of the films 45 may be increased so that the position of the band having a negative slope, which is originally at a relatively high position, shifts downward.

Such an adjustment for optimizing the refraction index can be mainly performed on the right side in FIG. 28, where the band edges are located. By such an adjustment, the bands of two defect wave guides having different refraction index distributions are in agreement with each other at the band edges.

FIGS. 30A through 30E schematically illustrate propagation states of light near the band edges in the refraction index distributed defect wave guide of the present embodiment.

Although the refraction index distributed photonic crystal does not have a definite band structure because of lack of periodicity, for simplicity of explanation, when it is assumed that the refraction index is approximately a constant at a position in the wave guide direction, bands related to different positions are used for explanation.

FIGS. 30A through 30E correspond to the bands at the positions A though E in FIG. 28, respectively, and the bands at symmetric upper and lower positions coincide with each other at their band edges. In the refraction index distributed photonic crystal, even when the frequency of light is the same, when the light is guided in the defect wave guide, because the bands change, the propagation states change greatly.

At the frequency shown by the solid line in FIGS. 30A through 30E, at position A and position B, the light is guided in accordance with the band having a negative slope. In this case, because the slope changes, the group speed position B is less than the group speed at position A, that is, the light propagates slowly. At position C, the light arrives at the band edge, and the group speed is nearly zero, hence, the light is localized. At the same time, directional coupling occurs at the band edge, because the band having a negative slope and the band having a positive slope have the same wave number and the same frequency at the band edge. After that, the group speeds increase when the light propagates through the position D and the position E sequentially. That is, the light which originally propagates in one wave guide with the propagation speed being maintained low arrives at the band edge, then a stagnation state of the light occurs while the light transfers to the other wave guide. The transferred light propagates at a low speed because of the influence of the low group speed near the band edge, and at last the light propagates forward while the propagation speed is increased.

In addition, at the positions above and below the dashed lines in FIG. 30, the positions where the light arrives at the band edges are different, and they are different from the position B or the position D, but it is clear from the band diagram that the light propagates in the same manner as shown by the solid line.

In the two different bands of a refraction index distributed defect wave guide, overlapping of the bands near the band edges is preferable because this increases direction coupling efficiency, and make the bands coincide with each other at the band edges. Due to this, it is possible to realize high light utilization efficiency. In addition, when a band having a positive slope and a band having a negative slope are used as the two different bands, in order for super low dispersion optical control to occur, it is preferable that the band edges be approximately symmetric in the up-down direction, and it is more preferable that the band edges be in agreement. Due to agreement of the band edges, for example, in the case of a linear refraction index distributed defect wave guide, the wavelength dispersion can be eliminated completely. In addition, even when the band edges are not in agreement, if the band edges are approximately symmetric in the up-down direction, by optimizing the band shape, the super low dispersion optical control can be essentially achieved. Specifically, near the band edge and with a specified wave number, preferably, the difference of the normalized frequencies is within 0.003, and more preferably, the difference of the normalized frequencies is within 0.001. When the specified wave number is 0.4, preferably, the difference of the normalized frequencies is within 0.005, and more preferably, the difference of the normalized frequencies is within 0.002.

As a result, a large dispersion control effect and a large group speed delay effect are achieved, and at the same time, a convenient transmission type optical control element is obtainable. Further, by setting the band edges to be approximately symmetric in the up-down direction, an optical control element can be obtained having super low dispersion. Further, in FIG. 28, in the two different refraction index distributed defect wave guides, in a photonic crystal structure involving a band having a positive slope and a band having a negative slope, by making the refraction index distributions different and optimizing the refraction index distributions, it is possible to realize bands whose band edges are set to be in agreement and approximately symmetric in the up-down direction. For this purpose, the arrangement of holes is the same, and it is possible to provide an optical control element from a photonic crystal, which can be fabricated easily.

The structure in FIG. 28 is not limited to formation of the small holes in the defect wave guide, any photonic crystal structure involving a band having a positive slope and a band having a negative slope is able to generate symmetric bands in the up-down direction.

Figure 29:
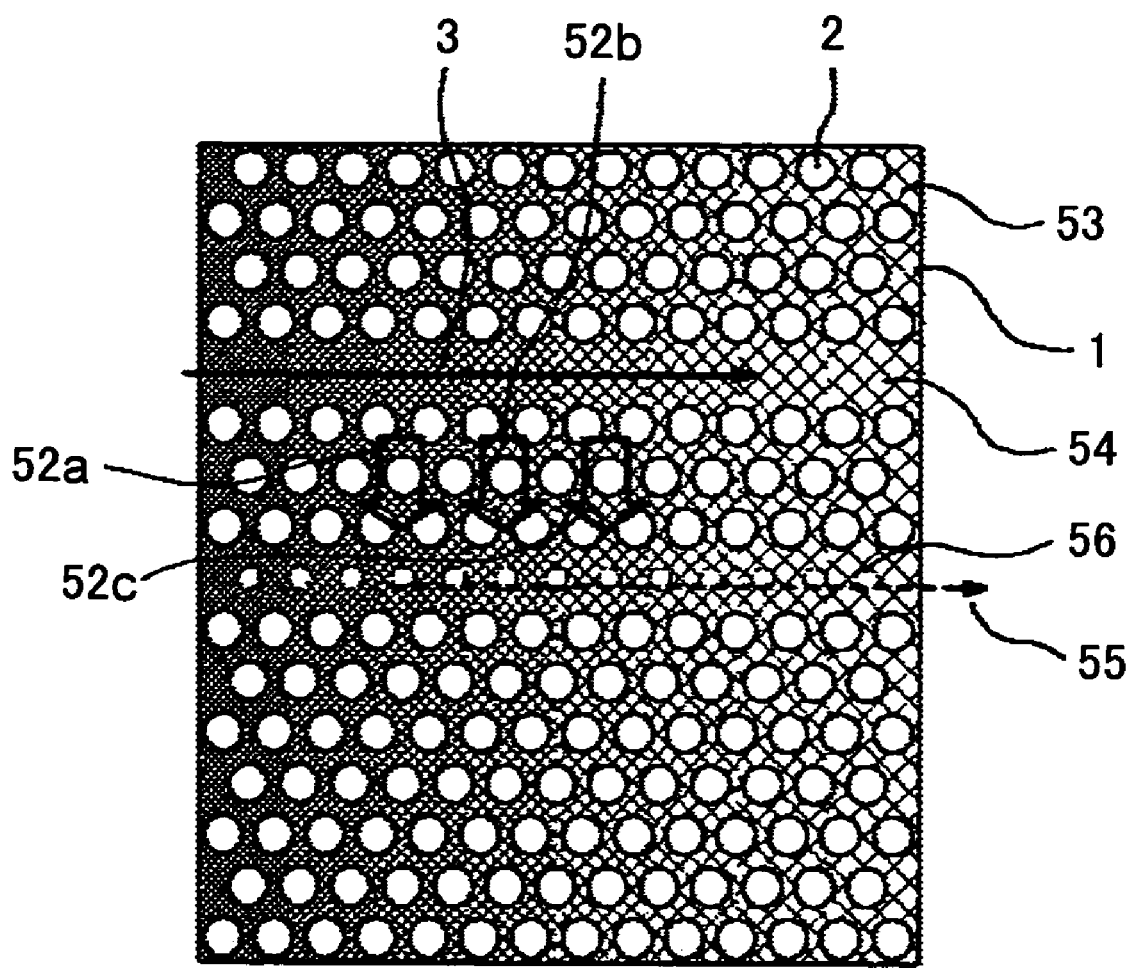
FIG. 29 is a schematic view of another example of the optical control element formed from a slab type two-dimensional photonic crystal according to the 15th embodiment of the present invention.
Figure 30A:
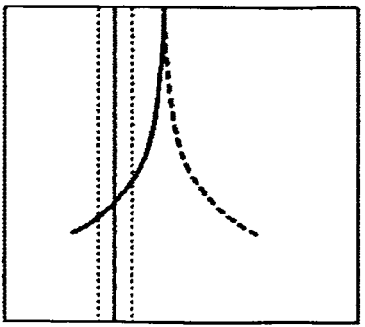
FIGS. 30A through 30E schematically illustrate propagation states of light near band edges in the refraction index distributed defect wave guide of the 15th embodiment.
Figure 30B:
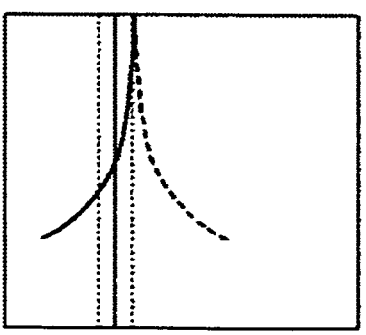
Figure 30C:
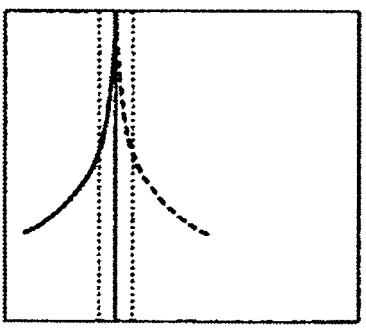
Figure 30D:
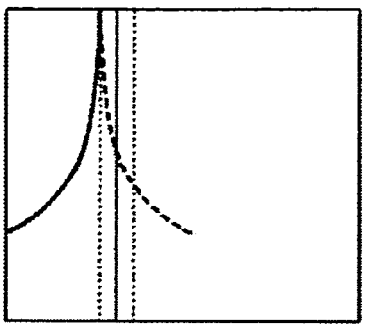
Figure 30E:
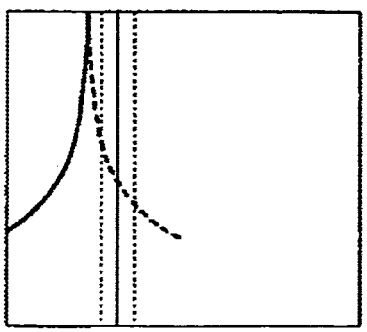

FIG. 29 is a schematic view of another example of the optical control element formed from a slab type two-dimensional photonic crystal according to the 15th embodiment of the present invention.

The optical control element shown in FIG. 29 includes a thin film 53 having a distributed refraction index, photonic crystal holes 2, and defect wave guides 3, 54, 55. Lights 49 and 51 (FIG. 28) are being guided by the defect wave guides 3, 54 and 55. In FIG. 29, the defect wave guide 55 includes small holes 56 formed at its center portion, and each of the small holes 56 is much smaller than the holes 2 that constitute the refraction index-distributed photonic crystal. The arrows 52a, 52b, and 52c show coupling positions of a directional coupler at three different frequencies.

The optical control element in FIG. 29, the same as the optical control element in FIG. 28, can realize bands whose band edges are set to be in agreement and approximately symmetric in the up-down direction. The optical control element in FIG. 29 has a large dispersion control effect and a large group speed delay effect, and it is also a convenient transmission type optical control element which does not require an optical separation element for bi-directional light propagation.

In FIG. 29, the small holes 56 are formed at the center portion of the defect wave guide 55, and these small holes 56 result in two different type bands, that is, band of negative dispersion and band of positive dispersion. Where necessary, the two types of bands are referred to as "band having a positive slope" and "band having a negative slope".

Because the band edges of the two types of bands are separated from each other, and in the simple refraction index-distributed defect wave guide 54, there is not a band having a positive slope, but a band having a negative slope. For this reason, refraction index distributions are imposed on the above structure so that the band edges of the band having a negative slope in the simple refraction index-distributed defect wave guide 54 are in agreement with the band having a positive slope in the refraction index-distributed defect wave guide 55, and the band edges are approximately in symmetry in the up-down direction.

Consequently, similar to the optical control element in FIG. 28, the optical control element in FIG. 29 shows a large dispersion control effect and a large group speed delay effect, and it is also a convenient transmission type optical control element. By arranging band edges to be approximately symmetric in the up-down direction, an optical control element can be obtained that has super low dispersion.

16th Embodiment

Below, the 16th embodiment of the present invention is explained with reference to FIG. 31 through FIG. 32. In the present embodiment, the same reference numbers are used for the same elements as those in the previous embodiments.

Figure 31:
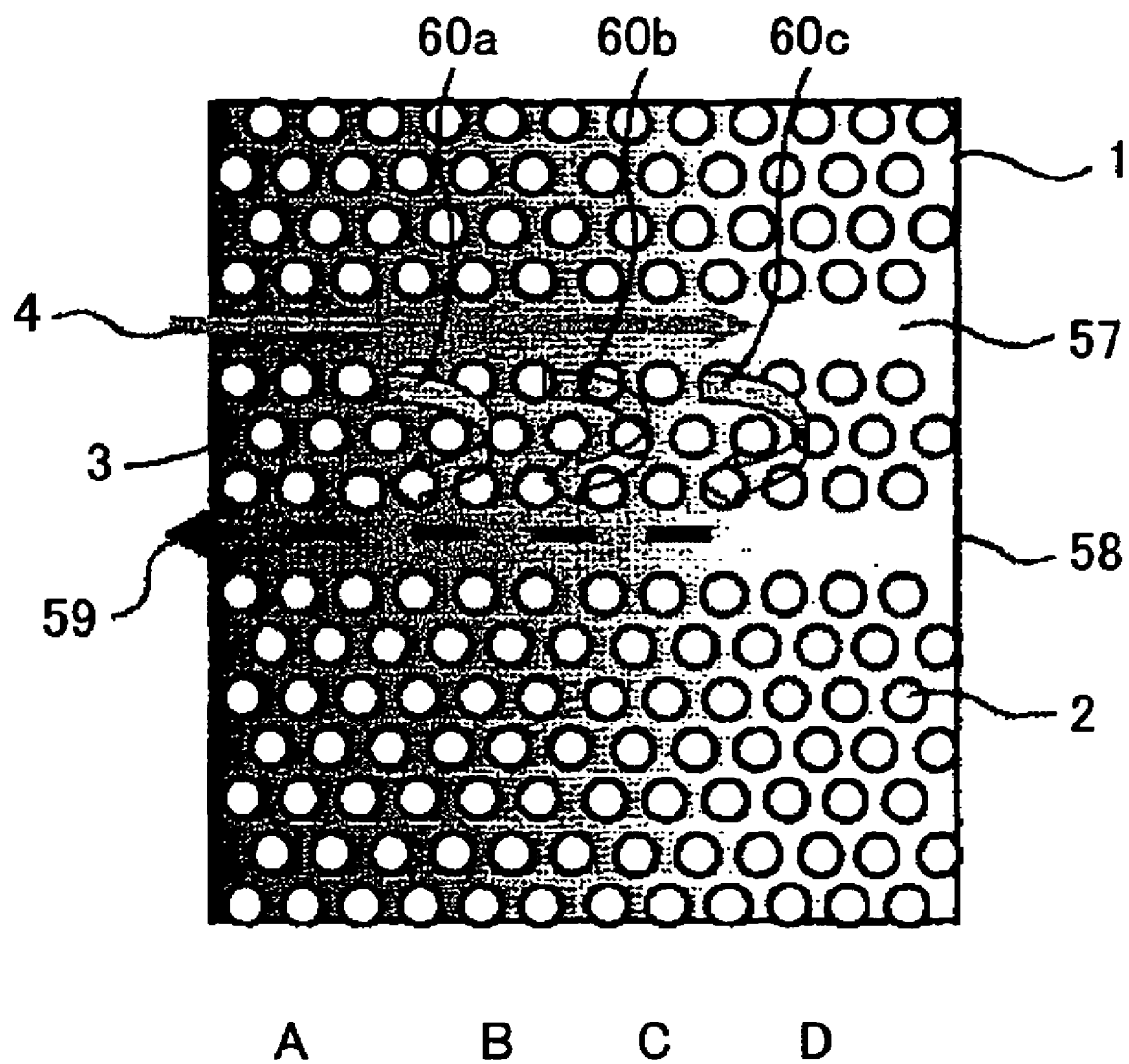
FIG. 31 is a schematic view of an example of the optical control element formed from a slab type two-dimensional photonic crystal according to a 16th embodiment of the present invention.
Figure 32A:
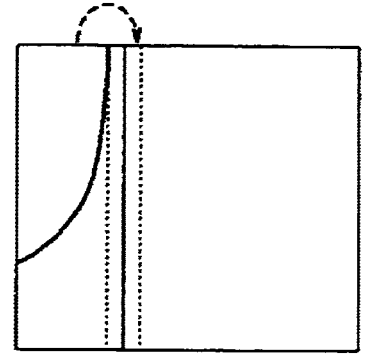
FIGS. 32A through 32D schematically illustrate propagation states of light near the band edges in the refraction index distributed defect wave guide of the 16th embodiment.
Figure 32B:
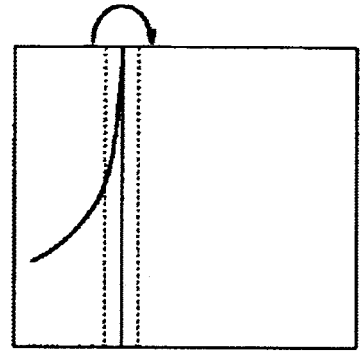
Figure 32C:
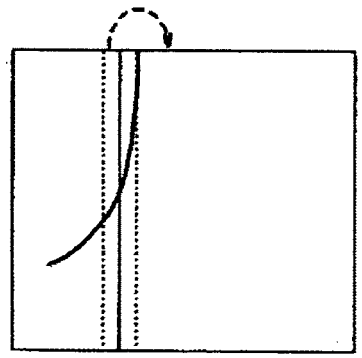
Figure 32D:
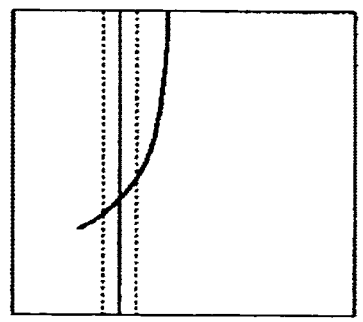

FIG. 31 is a schematic view of an example of the optical control element formed from a slab type two-dimensional photonic crystal according to the 16th embodiment of the present invention.

The optical control element shown in FIG. 31 includes a thin film 1 having a distributed refraction index, photonic crystal holes 2, and defect wave guides 3, 57 and 58. Lights 4 and 59 are being guided by the defect wave guides 3, 57 and 58. The arrows 60a, 60b, and 60c show coupling positions of a directional coupler at three different frequencies.

The optical control element in FIG. 31 has a large dispersion control effect and a large group speed delay effect. In the mean time, it is also a convenient transmission type optical control element, namely, it does not need an optical separation element for bi-directional light propagation.

Below, the principle is described of the optical control element.

In FIG. 31, a directional coupler is formed by two refraction index distributed defect wave guides, and the two defect wave guides have almost the same structure, hence, the bands of the two defect wave guides are almost the same. Therefore, it is easy to make the two bands in agreement with each other near the band edges, and further, it is also easy to make the whole bands in agreement with each other.

FIGS. 32A through 32D schematically illustrate propagation states of light near the band edges in the refraction index distributed defect wave guide of the present embodiment.

Although the refraction index distributed photonic crystal does not have a definite band structure because of lack of periodicity, for simplicity of explanation, when it is assumed that the refraction index is approximately a constant at a position in the wave guide direction, bands related to different positions are used for explanation.

FIGS. 32A through 32D correspond to the bands at the positions A though D in FIG. 31, respectively, and the bands at symmetric upper and lower positions coincide with each other at their band edges. In the refraction index distributed photonic crystal, even when the frequency of light is the same, when the light is guided in the defect wave guide, because the bands change, the propagation states change greatly.

At the frequency shown by the solid line in FIGS. 32A through 32D, at position A and position B, the light is guided in accordance with the band having a negative slope. In this case, because the slope changes, the group speed position B is less than the group speed at position A, that is, the light propagates slowly. At position C, the light arrives at the band edge, and the group speed is nearly zero; hence, the light is localized. At the same time, directional coupling occurs at the band edge, because the band having a negative slope and the band having a positive slope have the same wave number and the same frequency at the band edge. After that, the light propagates in the opposite direction to the state at B from D, as indicated by the arrow. The group speed increases when the light propagates in the opposite direction to the position B. That is, at the beginning, the light propagates in one wave guide with the propagation speed being maintained low and arrives at the band edge, then a stagnation state of the light occurs while the light transfers to the other wave guide. The transferred light propagates at a low speed because of the influence of the low group speed near the band edge, and at last the light propagates forward while the propagation speed is increased.

In addition, at the positions above and below the dashed lines in FIGS. 32A through 32D, the positions where the light arrives at the band edges are different, and they are different between the position B and the position D, but it is clear from the band diagram that the light propagates in the same manner as shown by the solid line.

The present embodiment is not for performing group speed delay control, namely, super low dispersion control, but for wide dispersion control. For this purpose, it is sufficient that the bands of the refraction index distributed defect wave guide overlap near the band edges, and as shown in FIGS. 32A through 32D, it is not necessary for the bands to nearly completely overlap with each other. In addition, in order to increase coupling efficiency of the directional coupler, it is also effective to make the photonic crystal structure non-symmetric, to produce an un-overlapping portion of the bands.

In the two different bands of a refraction index distributed defect wave guide, overlapping of the bands near the band edges is preferable because this increases direction coupling efficiency, and make the bands coincide with each other at the band edges. Due to this, it is possible to realize high light utilization efficiency.

In addition, when two bands each having a negative slope are used as the two different bands, in order for super low dispersion optical control to occur, it is preferable that the shapes of the bands be nearly the same with the band edges as a reference, and it is more preferable that the band edges be in agreement. Due to agreement of the band edges, for example, in the case of a linear refraction index distributed defect wave guide, the wavelength dispersion can be eliminated completely. In addition, even when the band edges are not in agreement, if the shapes of the two bands are approximately similar to each other, the super low dispersion optical control can be essentially achieved. Specifically, near the band edge and with a specified wave number, preferably, the difference of the normalized frequencies is within 0.003, and more preferably, the difference of the normalized frequencies is within 0.001. When the specified wave number is 0.4, preferably, the difference of the normalized frequencies is within 0.005, and more preferably, the difference of the normalized frequencies is within 0.002.

17th Embodiment

Below, the 17th embodiment of the present invention is explained with reference to FIG. 33. In the present embodiment, the same reference numbers are used for the same elements as those in the previous embodiments.

Figure 33:
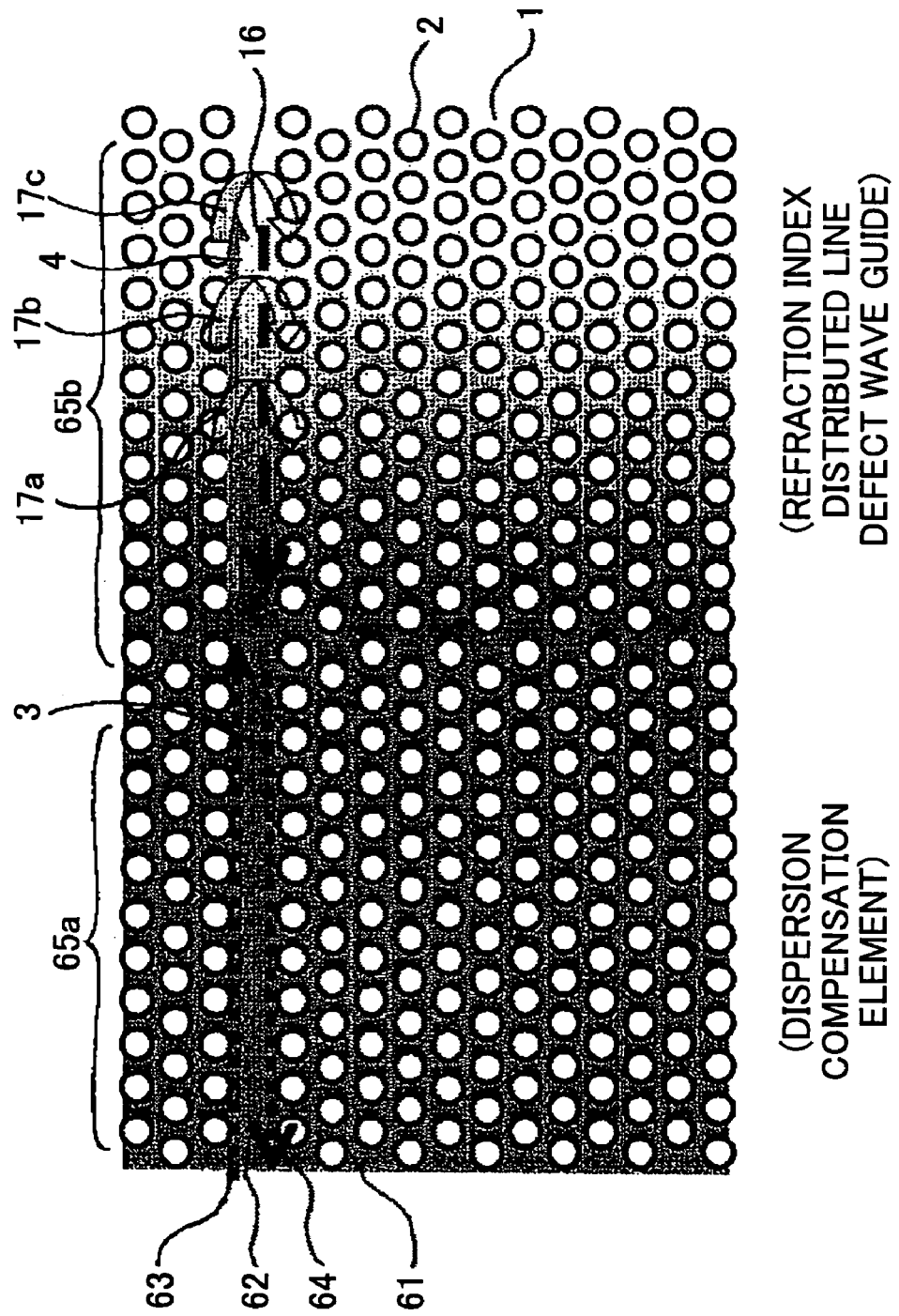
FIG. 33 is a schematic view of an example of the optical control element formed from a slab type two-dimensional photonic crystal according to a 17th embodiment of the present invention.

FIG. 33 is a schematic view of an example of the optical control element formed from a slab type two-dimensional photonic crystal according to the 17th embodiment of the present invention.

The optical control element shown in FIG. 33 includes a thin film 1 having a distributed refraction index, a thin film 61 having a uniform refraction index, photonic crystal holes 2, and defect wave guides 3, 62 and 64. Lights 4, 16, 63 and 64 are being guided by the defect wave guides 3, 62 and 64. The arrows 17a, 17b, and 17c show coupling positions of a directional coupler at three different frequencies. In FIG. 33, 65a is a defect wave guide having a uniform refraction index of the related art, and 65b is a refraction index distributed defect wave guide. As described above, the optical control element of the present embodiment is realized by combining a refraction index distributed defect wave guide and a usual defect wave guide.

The optical control element in FIG. 33 is capable of dispersion control and group speed delay with high precision. Below, the principle is described.

Although a refraction index distributed defect wave guide is able to control a delay of short pulses at super low dispersion, or control the dispersion with high precision, it is difficult for the refraction index distributed defect wave guide to control the delay and the dispersion with high precision at the same time. However, by providing an additional optical control element outside as a correction element, which gives a delay and dispersion in a different direction, it is possible to control the delay and the dispersion with high precision at the same time.

Preferably, a chirped grating or an optical fiber is used as a correction element of the optical control element. Further preferably, a photonic crystal defect wave guide formed from a material having a constant refractive index is used as a compact and high performance correction element of the optical control element.

Compared with other correction elements, a photonic crystal defect wave guide formed from a material having a constant refractive index has a dispersion property and a group speed delay property very similar to those of the refraction index distributed defect wave guide as shown in FIG. 1, FIG. 9, FIG. 28, FIG. 31, etc., and is capable of positive and negative dispersion compensation as well as high order dispersion compensation. In addition, the method of combining the above is not limited to end coupling; optical coupling by using optical fibers and lenses can also be used. Further, not only post compensation, but also pre-compensation or a combination of the post compensation and the pre-compensation can be used in order to achieve better correction effect. Due to this, a group speed delay can be generated without changing the pulse shape.

Even when the upper and lower bands of the refraction index distributed defect wave guide in FIG. 28 are not symmetric, super low dispersion can be realized by connecting to a correction element for adjusting the dispersion on the incidence side. Further, by setting the upper and lower bands of the refraction index distributed defect wave guide in FIG. 28 not to be symmetric in advance, and combining a correction element, desired dispersion and group speed delay can be obtained. Furthermore, a highly effective active element can be obtained by controlling these correction elements and the refraction index distributed defect wave guide from outside through an electro-optical effect, a non-linear optical effect, or a temperature change.

Figure 34:
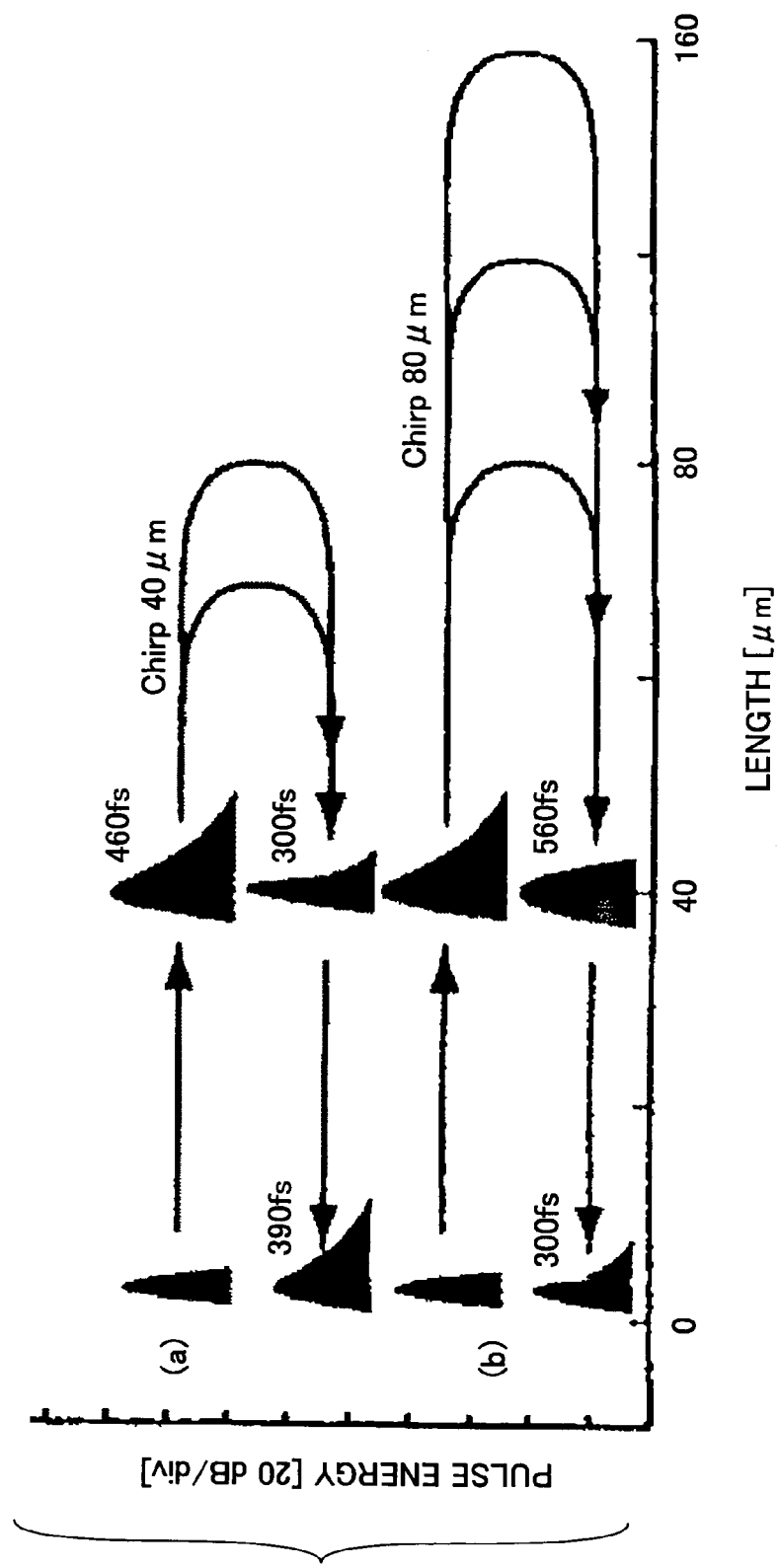
FIG. 34 illustrates the dispersion control effect and the group speed delay effect according to the 17th embodiment.

FIG. 34 illustrates strong dispersion control effect and group speed delay effect according to the present embodiment.

The portion (a) of FIG. 34 shows an example of the propagation state in an optical control element shown in FIG. 33, which is formed from a refraction index distributed photonic crystal and a usual defect wave guide from a usual photonic crystal having a constant refraction index.

In the thin film 1, the refraction index of the thin film 1 at the incident position is 2.963, and this refraction index linearly decreases continuously, becoming 2.800 near the band edge. In this case, the length of the defect wave guide involving the distributed refraction index is 40 µm, the period a of each hole is 0.39 µm, and the diameter 2r of each hole is 0.39 am. The refraction index of the thin film 61 is 2.963. This is a constant, and the length of the defect wave guide involving the constant refraction index is 40 µm.

The portion (a) of FIG. 34 shows an example of the propagation state of the light at a frequency having a band edge in the defect wave guide, with the light entering the optical control element of the above structure in a pulsed manner with a pulse width of 300 fs.

In FIG. 34, the abscissa represents a coordinate relative to an incident position of the short pulse in the photonic crystal, and the ordinate represents electric field strength. The wavelength of the light entering the wave guide is 1.55 µm, and the FWHM (Full Width at Half Maximum) of the short light pulse is 266 fs, shown as the width in the horizontal direction, which corresponds to the propagating group speed, and from this pulse width, the magnitude of the dispersion can be obtained. The light propagation state of the optical control element according to the present embodiment is obtained by numerical calculation through FDTD simulations.

As illustrated in the portion (a) of FIG. 34, the short-pulsed light has a spread wavelength region, and usually it is apt to be influenced by the wavelength dispersion, namely, frequency dispersion. Nevertheless, in the optical control element according to the present embodiment, while the pulse width on the incident side is 266 fs, the pulse width of the reflected light spreads to 460 fs temporarily after passing through the correction element, and shrinks to 300 fs by the refraction index distributed defect wave guide; that is, the short light pulse almost does not spread in the time domain.

Further, after the light pulse passes through the correction element again, the pulse width spreads to 390 fs. The propagation time of the light across the whole optical control element including the correction element and back is 6.10 ps. Hence, a highly compact optical control element is obtainable that is able to increase the group speed delay and reduce the dispersion at the same time, in contrast with the optical control element shown in the portion (b) in FIG. 12, which uses only the refraction index distributed defect wave guide. Therefore, it is possible to provide an optical control element that is able to-control the delay and the dispersion with high precision at the same time.

The present embodiment is not limited to the case in which the correction element is used in both the forward and returning path; for example, the correction element may be used only in the returning path, and this results in better dispersion control properties more effectively.

The portion (b) of FIG. 34 shows another example of the propagation state in an optical control element shown in FIG. 33, which is formed from a refraction index distributed photonic crystal and a usual defect wave guide from a usual photonic crystal having a constant refraction index.

In the thin film 1, the refraction index of the thin film 1 at the incident position is 2.963, and this refraction index linearly decreases continuously, and becomes 2.800 near the band edge. In this case, the length of the defect wave guide involving the distributed refraction index is 80 µm, the period a of each hole is 0.39 µm, and the diameter 2r of each hole is 0.39 µm. The refraction index of the thin film 61 is 2.963, and this is a constant, and the length of the defect wave guide involving the constant refraction index is 40 µm. The optical control element has an additional delay of 10 ps, and is formed from a combination of a defect wave guide having a constant refraction index and a defect wave guide having a distributed refraction index.

The portion (b) of FIG. 34 shows an example of the propagation state of the light at a frequency having a band edge in the defect wave guide, with the light entering the optical control element of the above structure in a pulsed manner with a pulse width of 300 fs.

As illustrated in the portion (b) of FIG. 34, the short-pulsed light has a spread wavelength region, and usually it is apt to be influenced by the wavelength dispersion, namely, frequency dispersion. Nevertheless, in the optical control element according to the present embodiment, while the pulse width on the incident side is 266 fs, the pulse width of the reflected light spreads to 560 fs after passing through the correction element. After the light pulse passes through the correction element again, the pulse width is reduced to the original value. The propagation time of the light across the whole optical control element including the correction element and back is 10.20 ps.

Hence, although the refraction index-distributed defect wave guide in the portion (b) of FIG. 34 is longer than that shown in the portion (a) of FIG. 34, a highly compact optical control element is obtained that is capable of dispersion control and group speed delay with high precision at the same time.

18th Embodiment

Below, the 18th embodiment of the present invention is explained with reference to FIG. 35. In the present embodiment, the same reference numbers are used for the same elements as those in the previous embodiments.

Figure 35:
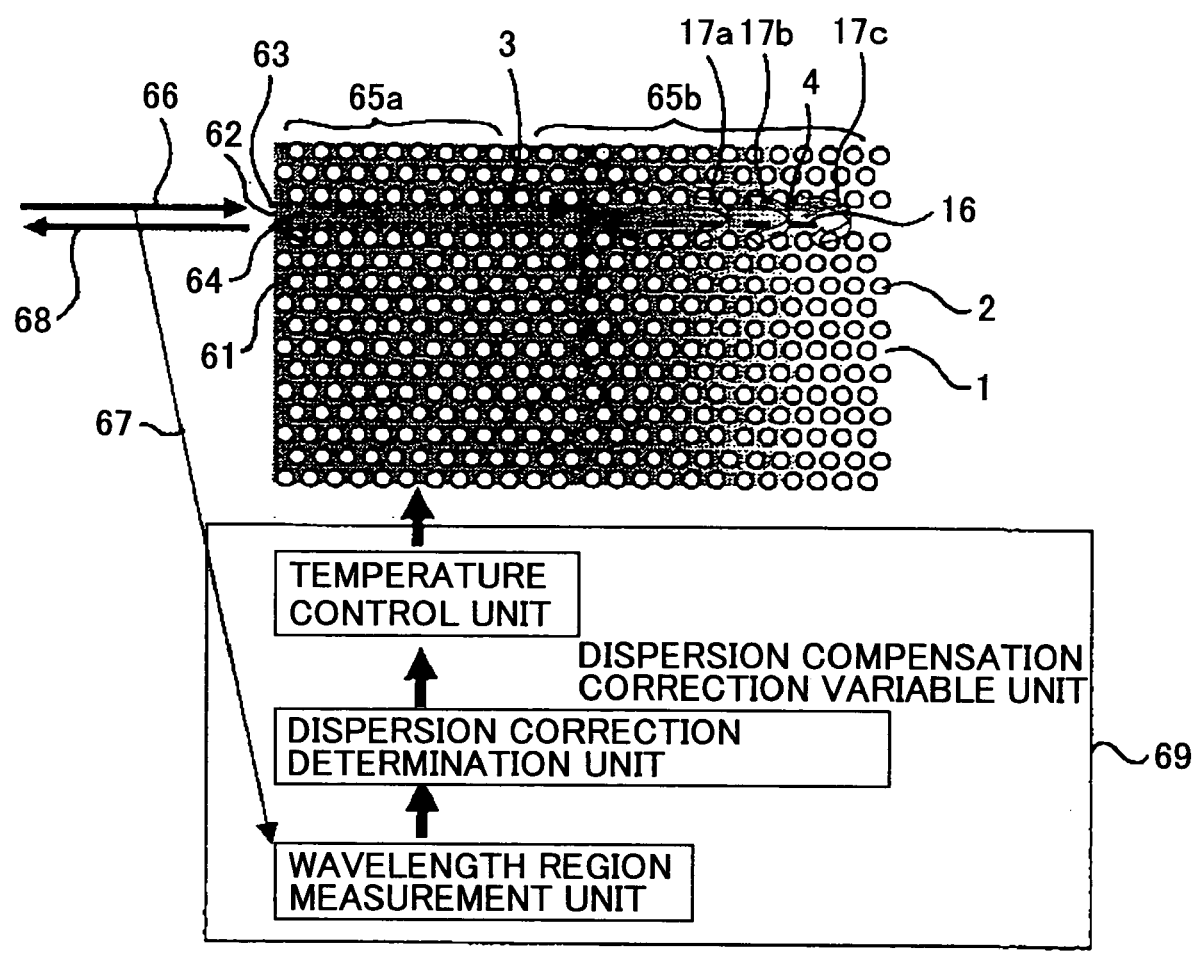
FIG. 35 is a schematic view of an example of the optical control element formed from a slab type two-dimensional photonic crystal according to a 18th embodiment of the present invention.

FIG. 35 is a schematic view of an example of the optical control element formed from a slab type two-dimensional photonic crystal according to the 18th embodiment of the present invention.

The optical control element shown in FIG. 35 includes a correction element, and a dispersion compensation correction variable unit 69 is provided for controlling the correction element, which includes a wavelength band measurement unit, a dispersion correction determination unit, and a temperature control unit.

Reference number 66 indicates incident light to the optical control element, and reference number 67 indicates a unit for branching a portion of the incident light and transmitting this portion to the wavelength band measurement unit of the dispersion compensation correction variable unit 69. Reference number 68 indicates outgoing light from the optical control element.

In FIG. 34, the dispersion compensation correction variable unit 69 detects the wavelength of the incident light to the optical control element, and in accordance with the detection results, the dispersion correction determination unit determines a dispersion correction value. Then in accordance with the determined dispersion correction value, the temperature control unit controls the temperature of the correction element. Due to such control, even when the wavelength fluctuates, it is possible to perform dispersion control and delay time control in good conditions. By providing a unit for measuring the dispersion of the incident light in addition to the wavelength band measurement unit, it is possible to effectively perform the dispersion control.

The unit for controlling the correction element is not limited to the temperature control unit, but can be any device able to change the refraction index or the electromagnetic strength in the wave guide by utilizing such as an electro-optical effect, a magneto-optical effect, or a non-linear optical effect. By using these devices, it is possible to perform the dispersion control and the group speed delay control with higher precision.

19th Embodiment

Below, the 19th embodiment of the present invention is explained with reference to FIG. 36. In the present embodiment, the same reference numbers are used for the same elements as those in the previous embodiments.

Figure 36:
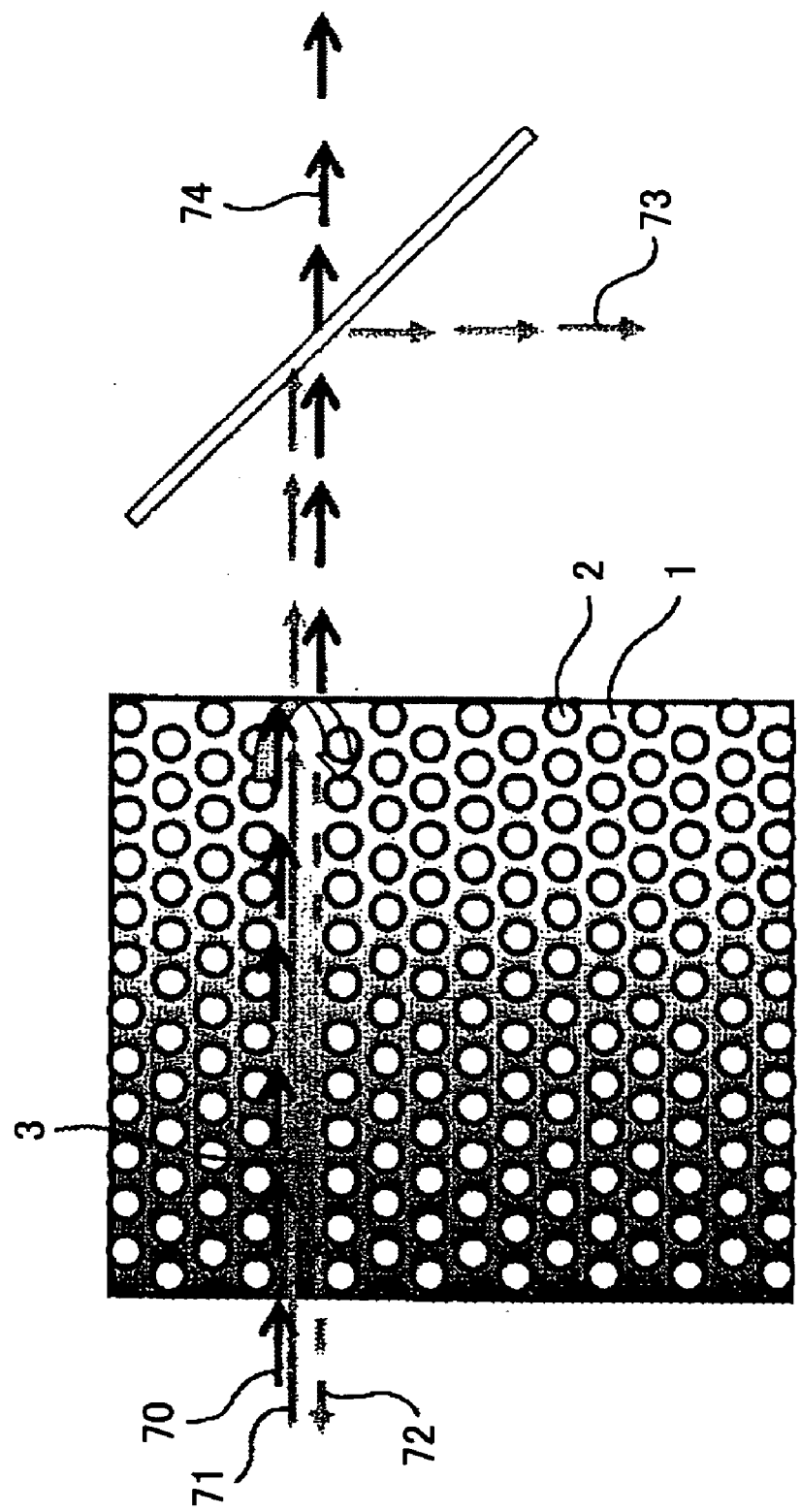
FIG. 36 is a schematic view of an example of the optical control element formed from a slab type two-dimensional photonic crystal according to a 19th embodiment of the present invention.

FIG. 36 is a schematic view of an example of the optical control element formed from a slab type two-dimensional photonic crystal according to the 19th embodiment of the present invention. The optical control element in FIG. 36 includes the refraction index distributed wave guide shown in FIG. 9 but formed from a non-linear material, hence has an optical-optical modulation function. Although not illustrated, by controlling the film thickness, the distributed refraction index is obtained.

In FIG. 36, continuous light 71 is incident to the optical control element, and usually, the incident light 71 is reflected at the band edge and becomes outgoing light 72. At this time, pulsed light 70 is incident to the optical control element with a frequency slightly higher than that of the continuous incident light 71. Because the continuous incident light 71 is near the band edge, the group speed thereof is very low, hence the non-linear effect is enhanced.

The continuous incident light 71 is localized at the band edge, and this also enhances the non-linear effect, but it is preferable that the strength of the pulsed light be set large.

The pulsed light 70 is incident to the optical control element, and due to the pulsed light 70, the refraction index increase, and hence, the band corresponding to the continuous incident light 71 lowers. Thus, reflection does not occur at the band edge, and the continuous incident light 71 is output as pulsed light. That is, an optical switch or an optical modulator is obtained.

The refraction index distributed wave guide formed from a non-linear material is not limited to the optical switch or the optical modulator using the band edge; it can be used for devices utilizing the non-linear optical effect, such as a wavelength converter, an optical switch, a four-wave mixing device, an optical modulator, an optical memory, and an optical delay element. Due to usage of the refraction index distributed wave guide formed from a non-linear material, it is possible to increase the optical constant to be higher than the group speed delay by two through four orders of magnitude, hence improving the performance dramatically.

20th Embodiment

Below, the 20th embodiment of the present invention is explained with reference to FIG. 37. In the present embodiment, the same reference numbers are used for the same elements as those in the previous embodiments.

Figure 37:
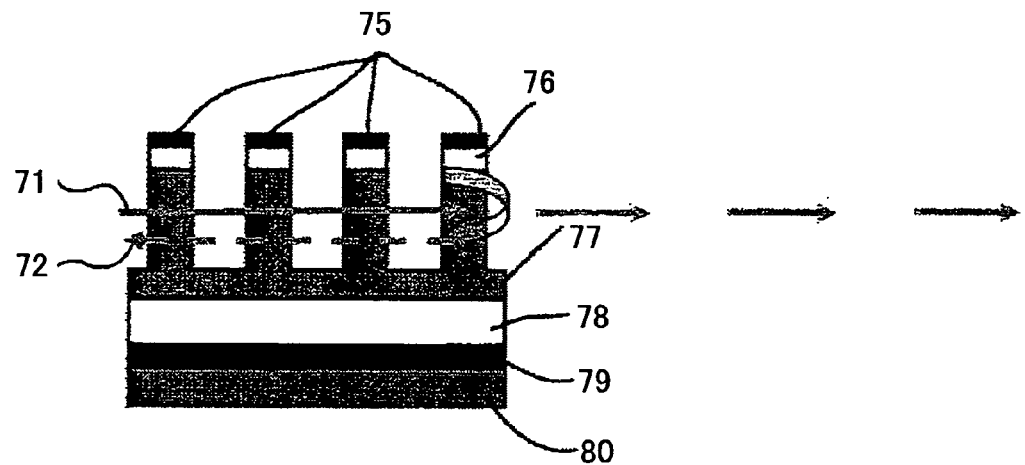
FIG. 37 is a schematic view of an example of the optical control element formed from a slab type two-dimensional photonic crystal according to a 20th embodiment of the present invention.

FIG. 37 is a schematic view of an example of the optical control element formed from a slab type two-dimensional photonic crystal according to the 20th embodiment of the present invention. The optical control element in FIG. 37 includes the refraction index distributed wave guide shown in FIG. 9 but formed from an electrical optical material, hence has an electronic-optical modulation function. Although not illustrated, by controlling the film thickness, the height of a pillar structure continuously changes, and the distributed refraction index is obtained.

The optical control element in FIG. 37 includes an electro-optical crystal 77, insulating materials 76 and 78, electrodes 75 and 79, and a substrate 80.

In FIG. 37, continuous incident light from the left side is reflected at the band edge in the defect wave guide. At this time, by applying a voltage on the electrodes, the band edge lowers, reflection does not occur at the band edge, and the continuous incident light can be modulated.

The refraction index distributed wave guide formed from an electro-optical material is not limited to the optical modulator using the band edge. It can be used for devices utilizing the electro-optical effect, such as a wavelength converter, an optical switch, a four-wave mixing device, an optical modulator, an optical memory, and an optical delay element. Due to usage of the above refraction index distributed wave guide, it is possible to reduce the optical constant due to the group speed delay, hence improving the performance dramatically.

21st Embodiment

Below, the 21st embodiment of the present invention is explained with reference to FIG. 38. In the present embodiment, the same reference numbers are used for the same elements as those in the previous embodiments.

Figure 38:
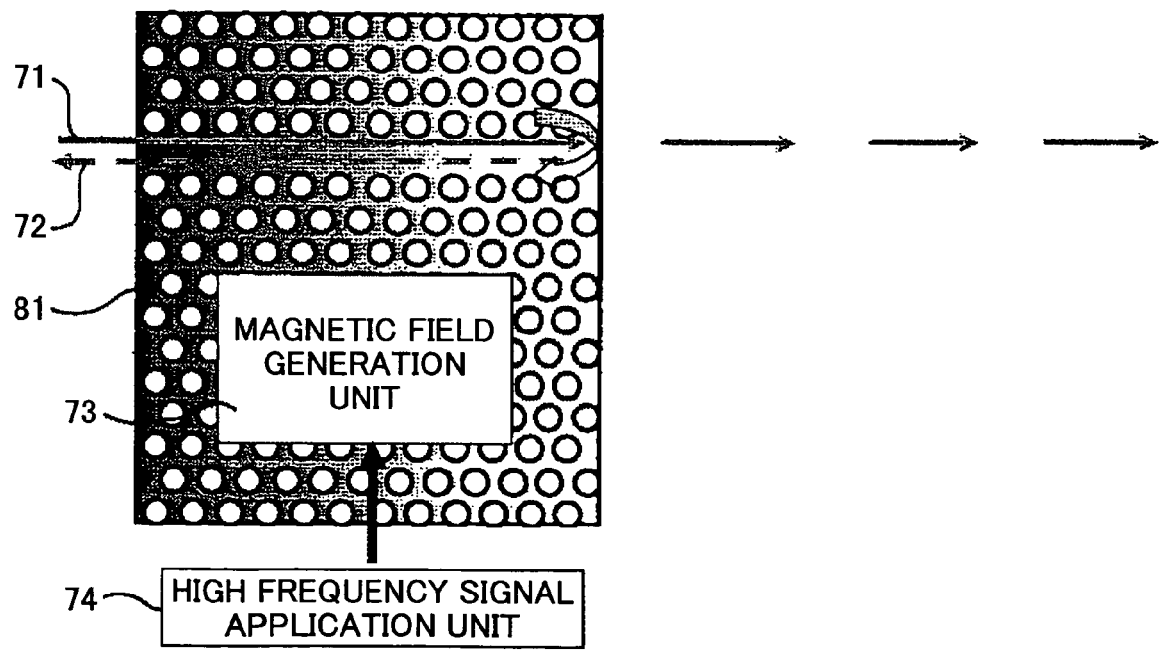
FIG. 38 is a schematic view of an example of the optical control element formed from a slab type two-dimensional photonic crystal according to a 21st embodiment of the present invention.

FIG. 38 is a schematic view of an example of the optical control element formed from a slab type two-dimensional photonic crystal according to the 21st embodiment of the present invention. The optical control element in FIG. 38 includes the refraction index distributed wave guide shown in FIG. 9 but formed from a magnetic optical material, hence has a magnetic-optical modulation function. Although not illustrated, by controlling the film thickness, the height of a pillar structure changes continuously, and the distributed refraction index is obtained.

The optical control element in FIG. 38 includes a magnetic-optical crystal 81, a high frequency signal application unit 74, and a magnetic field generation unit 73.

In FIG. 38, continuous incident light 71 from the left side is reflected at the band edge in the defect wave guide and generating reflected light 72.

At this time, the magnetic field generation unit 73 generates a magnetic field in accordance with the voltage from the high frequency signal application unit 74, and polarized light rotates.

The light that cannot exist in the photonic crystal is emitted as relatively divergent light from the right side of the element in which light is localized, thereby, realizing an optical control element capable of magnetic-optical modulation.

The refraction index distributed wave guide formed from a magnetic-optical material is not limited to the optical modulator using the band edge. It can be used for devices utilizing the magnetic-optical effect, such as a wavelength converter, an optical switch, a four-wave mixing device, an optical modulator, an optical memory, and an optical delay element. Due to usage of the above refraction index distributed wave guide, it is possible to reduce the optical constant due to the group speed delay, hence improving the performance dramatically.

22nd Embodiment

Below, the 22nd embodiment of the present invention is explained with reference to FIG. 39. In the present embodiment, the same reference numbers are used for the same elements as those in the previous embodiments.

Figure 39:
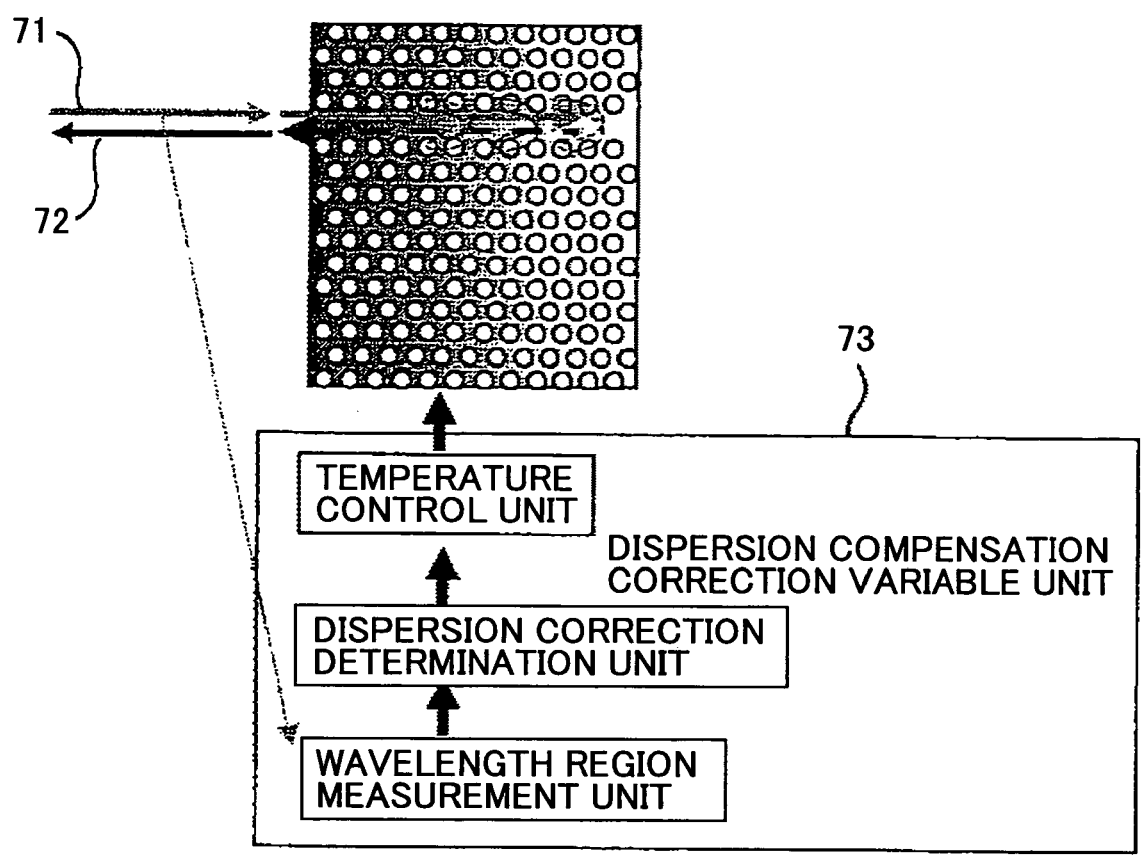
FIG. 39 is a schematic view of an example of the optical control element formed from a slab type two-dimensional photonic crystal according to a 22nd embodiment of the present invention.
Figure 40A:
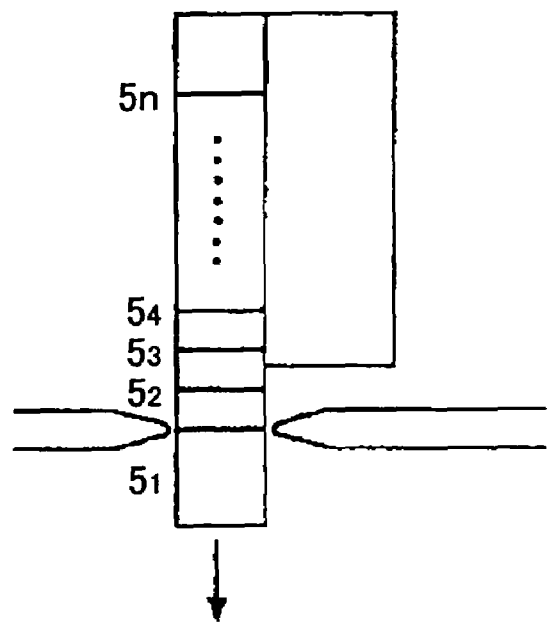
FIGS. 40A through 40C are views of a dispersion compensation device using a coupled defect wave guide in the related art.
Figure 40B:
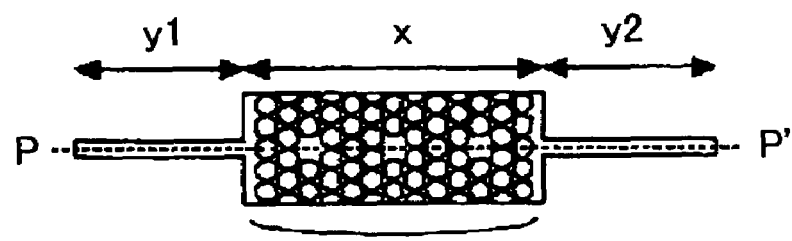
Figure 40C:
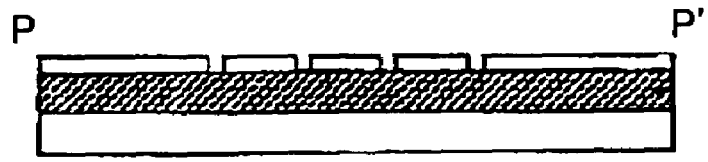

FIG. 39 is a schematic view of an example of the optical control element formed from a slab type two-dimensional photonic crystal according to the 22nd embodiment of the present invention. The optical control element in FIG. 39 includes the refraction index distributed wave guide shown in FIG. 9. Although not illustrated, by controlling the film thickness, the height of a pillar structure changes continuously, and the distributed refraction index is obtained.

In FIG. 39, a dispersion compensation correction variable unit 73 detects the wavelength of the incident light to the optical control element, and in accordance with the detection results, the dispersion correction determination unit determines a dispersion correction value, and in accordance with the determined dispersion correction value, the temperature control unit controls the temperature of the correction element.

Due to such control, even when the wavelength fluctuates, it is possible to perform dispersion control and delay time control in good conditions. By providing a unit for measuring the dispersion of the incident light in addition to the wavelength band measurement unit, it is possible to effectively perform dispersion control. In addition, by using temperature control in reflectivity or transmission control, it is possible to realize a highly compact attenuator.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Applications No. 2003-394536 filed on Nov. 25, 2003 and No. 2004-039817 filed on Apr. 2, 2004, the entire contents of which are hereby incorporated by reference.

What is claimed is:

1. An optical control element formed from a photonic crystal, said optical control element comprising:
   a first portion in the photonic crystal that has a first refraction index;
   a second portion in the photonic crystal that has a second refraction index lower than the first refraction index;
   a refraction-index-distributed type defect wave guide wherein a difference between an effective refraction index of the first portion and an effective refraction index of the second portion changes continuously along a wave guiding direction of the refraction-index-distributed type defect wave guide; and
   a thin film having a thickness changing along the wave guiding direction.

2. An optical control element formed from a photonic crystal, said optical control element comprising:
   a first portion in the photonic crystal that has a first refraction index;
   a second portion in the photonic crystal that has a second refraction index lower than the first refraction index; and a refraction-index-distributed type defect wave guide wherein a difference between an effective refraction index of the first portion and an effective refraction index of the second portion changes continuously along a wave guiding direction of the refraction-index-distributed type defect wave guide, wherein a lattice arrangement of the photonic crystal near the refraction-index-distributed type defect wave guide is distorted, and the distortion changes along the wave guiding direction of the refraction-index-distributed type defect wave guide.

3. The optical control element as claimed in claim 2, wherein the photonic crystal comprises:
   a plurality of holes; wherein
   a ratio of a radius of one of the holes to a pitch of the holes changes along the wave guiding direction near the refraction-index-distributed type defect wave guide.

4. The optical control element as claimed in claim 2, wherein the photonic crystal comprises:
   a plurality of holes; wherein
   a pitch of the holes changes along the wave guiding direction near the refraction-index-distributed type defect wave guide.

5. An optical control element formed from a photonic crystal, said optical control element comprising:
   a first portion in the photonic crystal that has a first refraction index;
   a second portion in the photonic crystal that has a second refraction index lower than the first refraction index;
   a refraction-index-distributed type defect wave guide wherein a difference between an effective refraction index of the first portion and an effective refraction index of the second portion changes continuously along a wave guiding direction of the refraction-index-distributed type defect wave guide; and
   a photonic crystal defect structure near the refraction-index-distributed type defect wave guide and able to be connected to the refraction-index-distributed type defect wave guide,
   wherein the photonic crystal connection defect structure comprises a connection defect wave guide formed from a defect wave guide, and
   the connection defect wave guide is a second refraction-index-distributed type defect wave guide different from said refraction-index-distributed type defect wave guide.

6. The optical control element as claimed in claim 5, wherein each of said two refraction-index-distributed type defect wave guides generates a band having a band edge in a photonic bandgap, and the bands of said two refraction-index-distributed type defect wave guides overlap with each other near the band edges.

7. The optical control element as claimed in claim 5, wherein the bands of said two refraction-index-distributed type defect wave guides in photonic bandgaps thereof are on opposite sides of a band edge.

8. The optical control element as claimed in claim 7, wherein the bands of said two refraction-index-distributed type defect wave guides in the photonic bandgaps thereof are nearly symmetric relative to the band edge near the band edge.

9. The optical control element as claimed in claim 5, wherein the bands of said two refraction-index-distributed type defect wave guides in photonic bandgaps thereof are on the same side of the band edge near the band edge.

10. The optical control element as claimed in claim 9, wherein the bands of said two refraction-index-distributed type defect wave guides in the photonic bandgaps thereof are partially approximately the same near the band edge.

11. An optical control element formed from a photonic crystal, said optical control element comprising:
    a first portion in the photonic crystal that has a first refraction index of a base material of the first portion;
    a second portion forming a hole structure in the photonic crystal that has a second refraction index lower than the first refraction index; and
    a refraction-index-distributed type defect wave guide,
    wherein a difference between the first refraction index of the first portion and the second refraction index of the second portion changes continuously along a wave guiding direction of the refraction-index-distributed type defect wave guide and
    the first portion has a refraction-index distribution changing continuously, by a variation in the material properties of the base material of the first portion, from a relatively high refraction index to a relatively low refraction index in the same material of the first portion.

12. An optical control element formed from a photonic crystal, said optical control element comprising:
    a first portion in the photonic crystal that has a first refraction index of a base material of the first portion;
    a second portion forming a hole structure in the photonic crystal that has a second refraction index lower than the first refraction index; and
    a refraction-index-distributed type defect wave guide,
    wherein a difference between an effective refraction index of the first portion and an effective refraction index of the second portion changes continuously along a wave guiding direction of the refraction-index-distributed type defect wave guide, and
    the first portion has a refraction-index distribution changing continuously, by a variation in the material properties of the base material of the first portion, from a relatively high refraction index to a relatively low refraction index in the same base material of the first portion.

13. The optical control element as claimed in claim 12, wherein the refraction-index-distributed type defect wave guide generates a band having a band edge in a photonic bandgap of the refraction-index-distributed type defect wave guide with respect to a wavelength of light guided in the refraction-index-distributed type defect wave guide.

14. The optical control element as claimed in claim 12, wherein the change of the difference between the effective refraction index of the first portion and the effective refraction index of the second portion is generated from a change of a structure of the photonic crystal.

15. The optical control element as claimed in claim 12, wherein the refraction-index-distributed type defect wave guide comprises:
    a portion having an increasing difference of the effective refraction indexes; and
    a portion having a decreasing difference of the effective refraction indexes.

16. The optical control element as claimed in claim 12, further comprising:
    a photonic crystal defect structure near the refraction-index-distributed type defect wave guide and able to be connected to the refraction-index-distributed type defect wave guide.

17. The optical control element as claimed in claim 16, wherein the photonic crystal defect structure comprises:

an intermediate connection defect structure able to be connected to the refraction-index-distributed type defect wave guide; wherein the photonic crystal connection defect structure is able to be connected to the intermediate connection defect structure.

18. The optical control element as claimed in claim 16, wherein the photonic crystal connection defect structure comprises:

a connection defect wave guide formed from a defect wave guide.

19. The optical control element as claimed in claim 18, wherein the connection defect wave guide is coupled by a directional coupler.

20. The optical control element as claimed in claim 12, further comprising:

a dispersion compensation correction element on an incident side or an outgoing side of the refraction-index-distributed type defect wave guide.

21. The optical control element as claimed in claim 20, wherein the dispersion compensation correction element comprises:

a photonic crystal defect wave guide.

22. The optical control element as claimed in claim 21, wherein the dispersion compensation correction element comprises:

a dispersion compensation correction variable unit configured to variably control a correction to the dispersion compensation.

23. The optical control element as claimed in claim 12, further comprising:

an optical control unit operating by means of a non-linear optical effect in the refraction-index-distributed type defect wave guide.

24. The optical control element as claimed in claim 12, further comprising:

an optical control unit operating by means of an electro-optical effect in the refraction-index-distributed type defect wave guide.

25. The optical control element as claimed in claim 12, further comprising:

an optical control unit operating by means of a magnetic-optical effect in the refraction-index-distributed type defect wave guide.

26. The optical control element as claimed in claim 12, further comprising:

a temperature control unit that controls a temperature of the refraction-index-distributed type defect wave guide.

* * * * *